United States Patent [19]
Hammack

[11] 3,795,911
[45] Mar. 5, 1974

[54] METHOD AND APPARATUS FOR AUTOMATICALLY DETERMINING POSITION-MOTION STATE OF A MOVING OBJECT

[76] Inventor: Calvin Miles Hammack, P.O. Box 304, Saratoga, Calif. 95030

[22] Filed: Sept. 21, 1970

[21] Appl. No.: 74,180

Related U.S. Application Data

[63] Continuation-in-part of Ser. Nos. 86,770, Feb. 2, 1961, Pat. No. 3,706,096, and Ser. No. 278,191, May 6, 1963, abandoned.

[52] U.S. Cl. .................................. 343/9, 343/112 R
[51] Int. Cl. ............................................... G01s 9/44
[58] Field of Search...340/3 D, 6 R; 343/9, 15, 112 R

[56] References Cited
UNITED STATES PATENTS

| | | | |
|---|---|---|---|
| 2,968,034 | 1/1961 | Cafarelli............................ | 343/112 R |
| 3,155,937 | 11/1964 | Grimm et al..................... | 343/112 R |
| 3,172,108 | 3/1965 | McClure .......................... | 343/112 R |
| 3,191,176 | 6/1965 | Guier................................ | 343/112 R |

*Primary Examiner*—Stephen C. Bentley
*Attorney, Agent, or Firm*—Victor R. Beckman

[57] ABSTRACT

This invention relates to an improvement in the art of detecting and tracking moving objects employing a plurality of stations and variational measurements.

28 Claims, 13 Drawing Figures

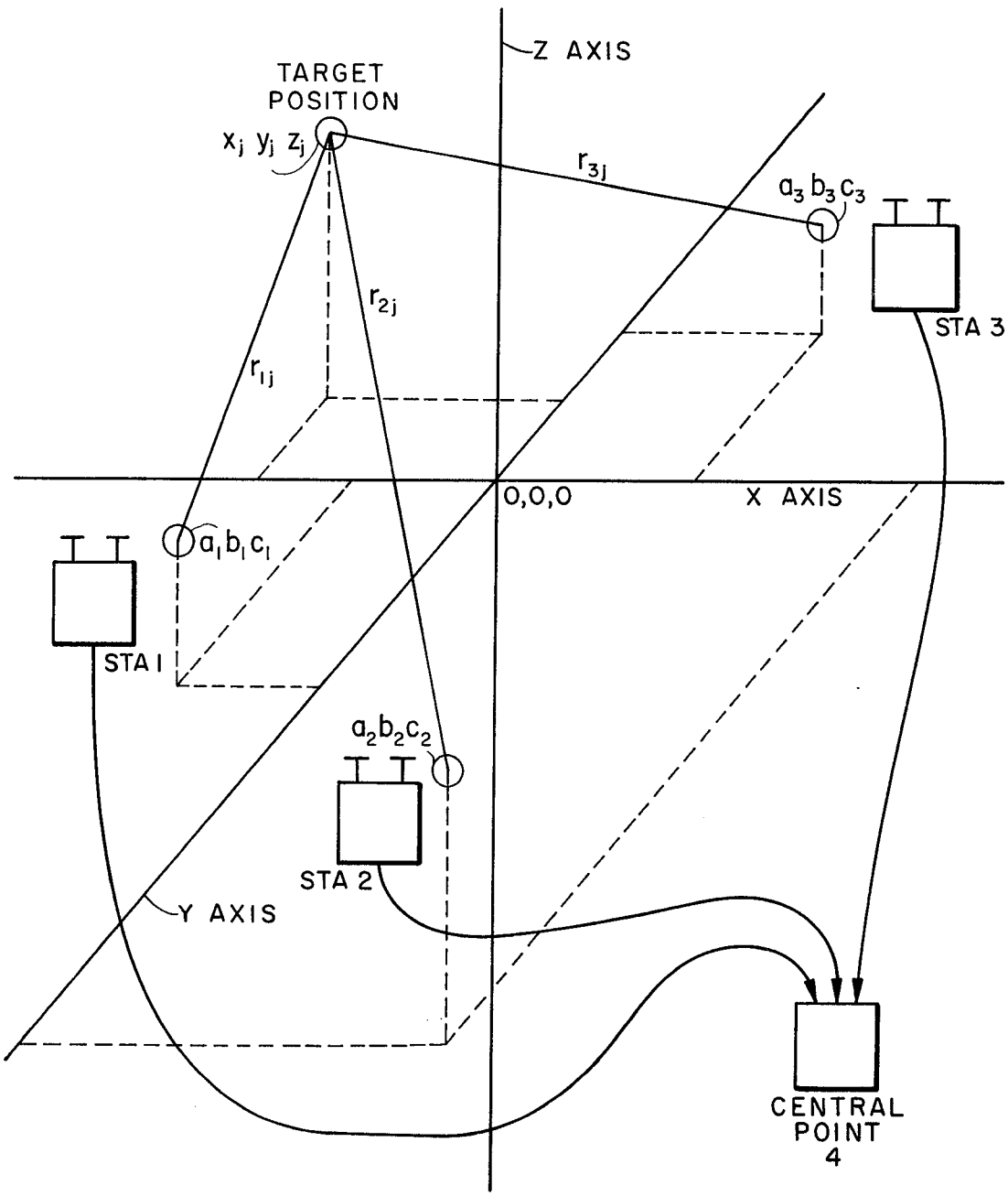
FIG__1

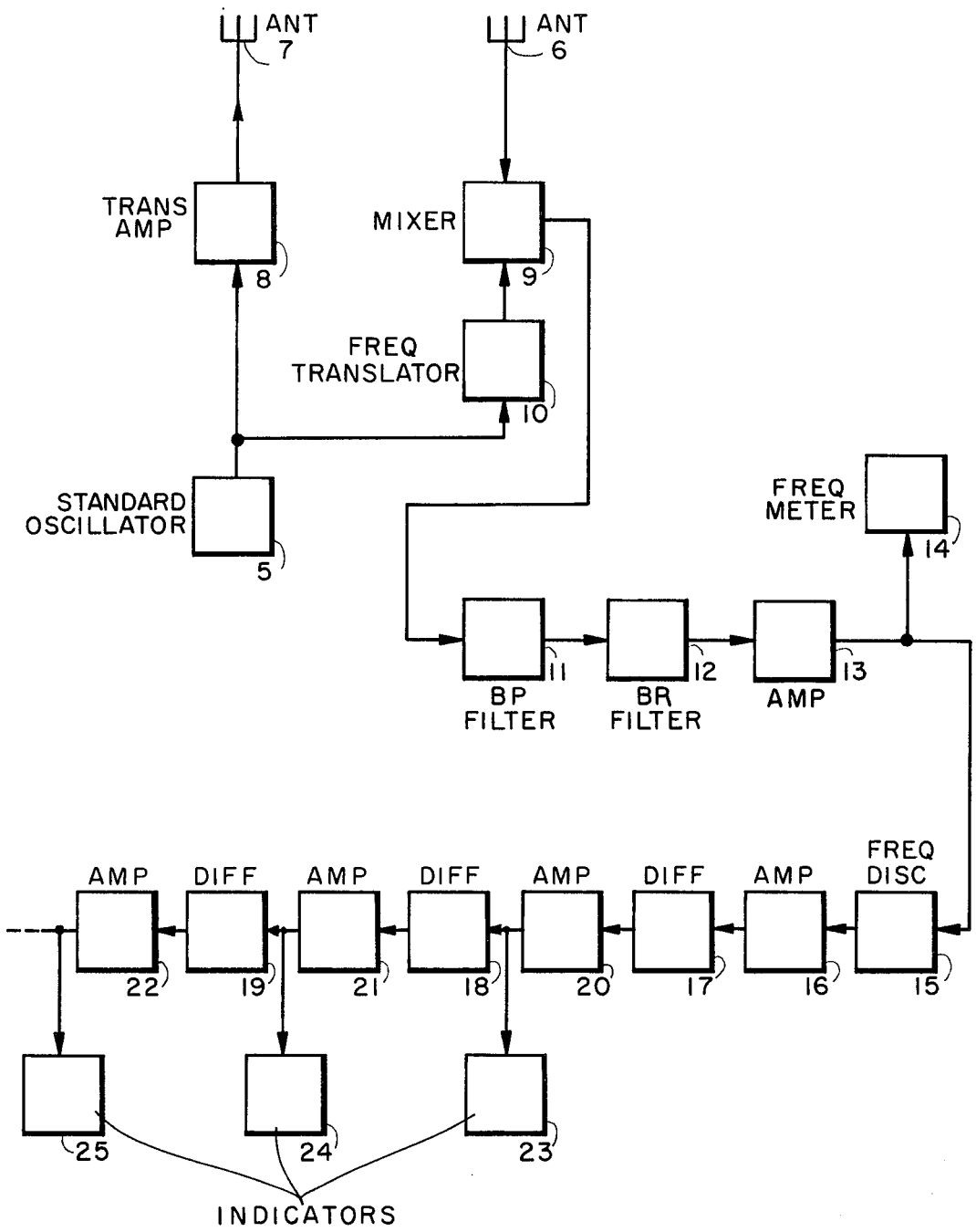
FIG__2

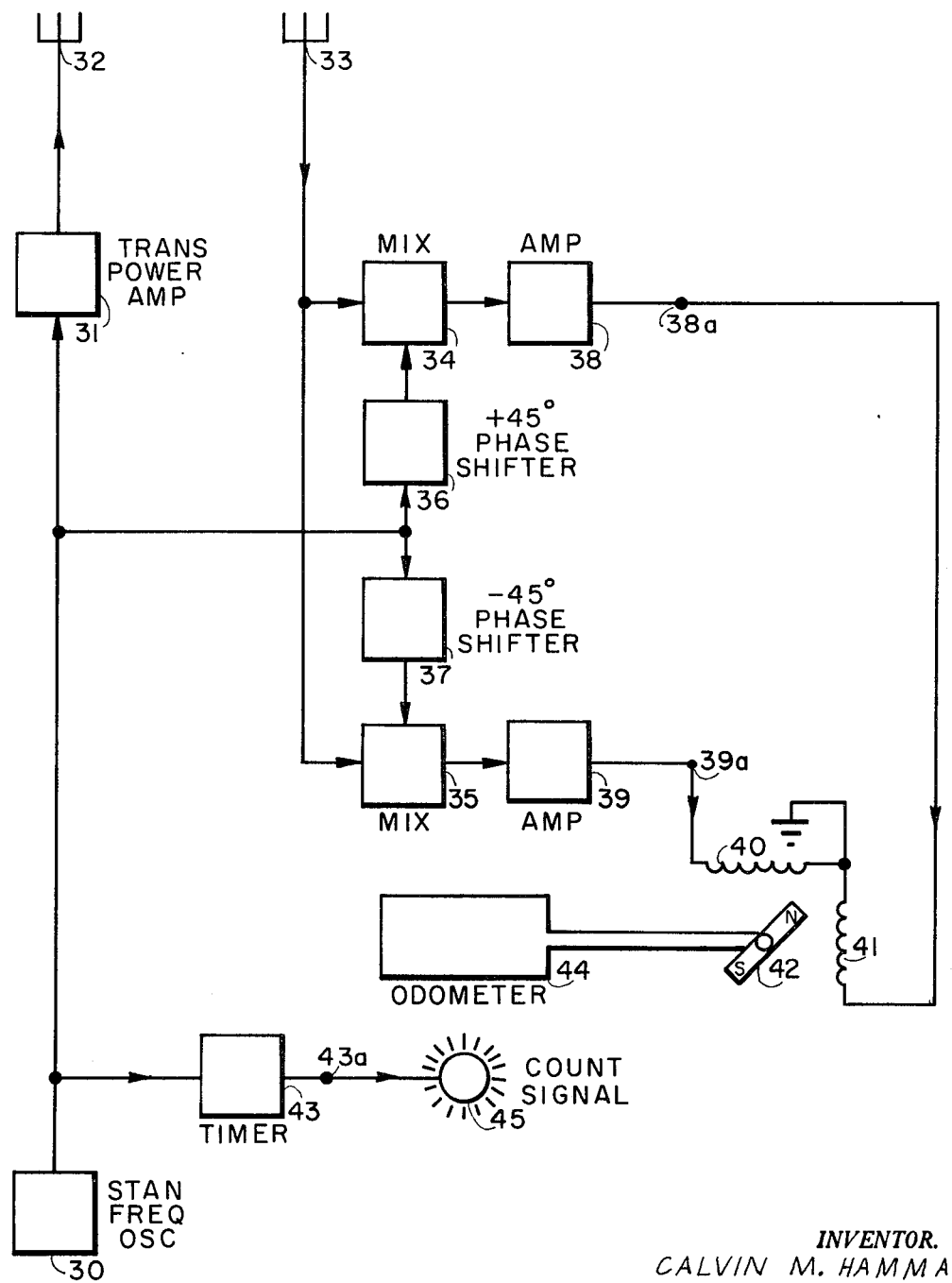
FIG_3

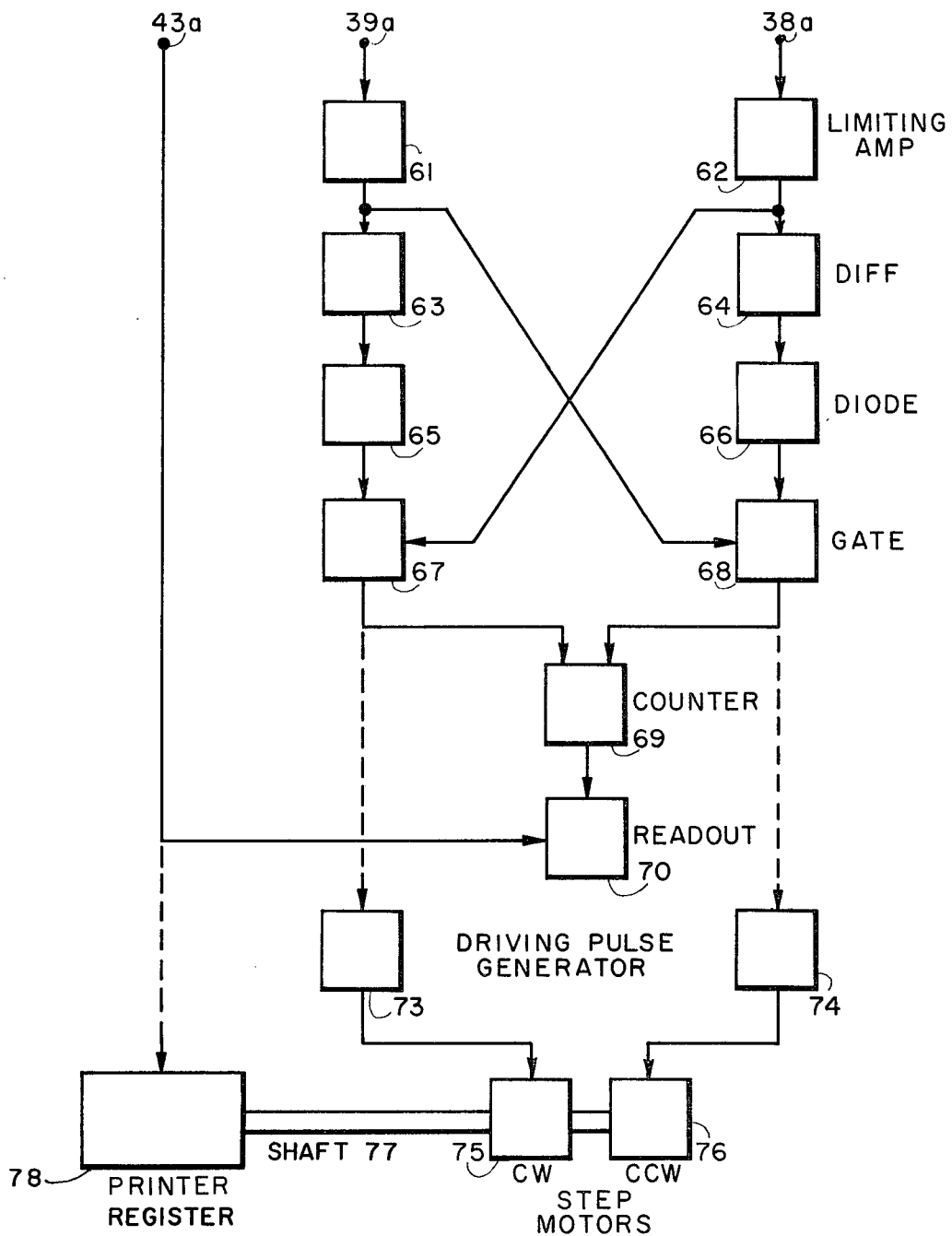
FIG_4

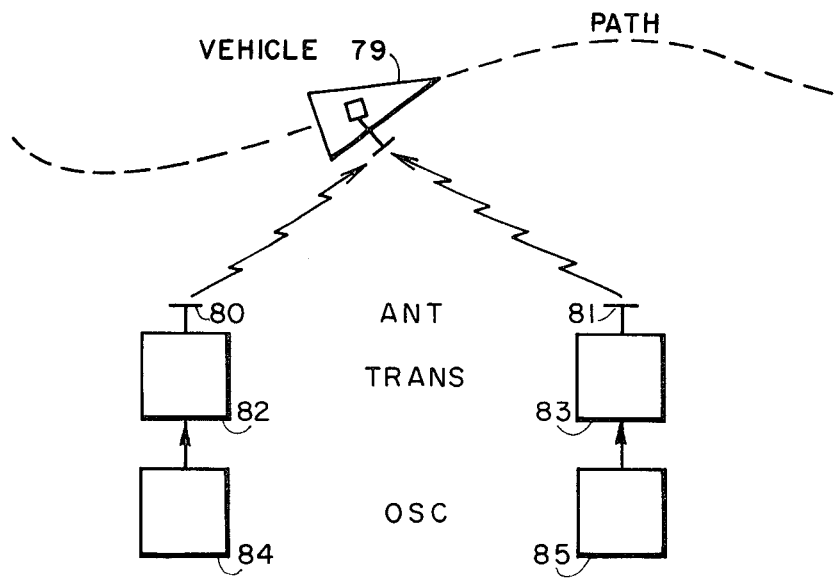
FIG_5
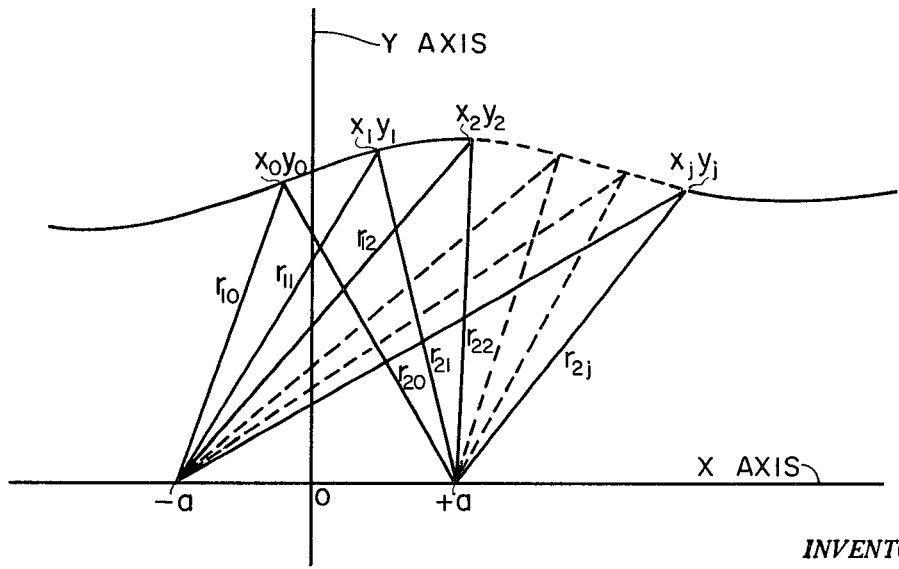
FIG_6

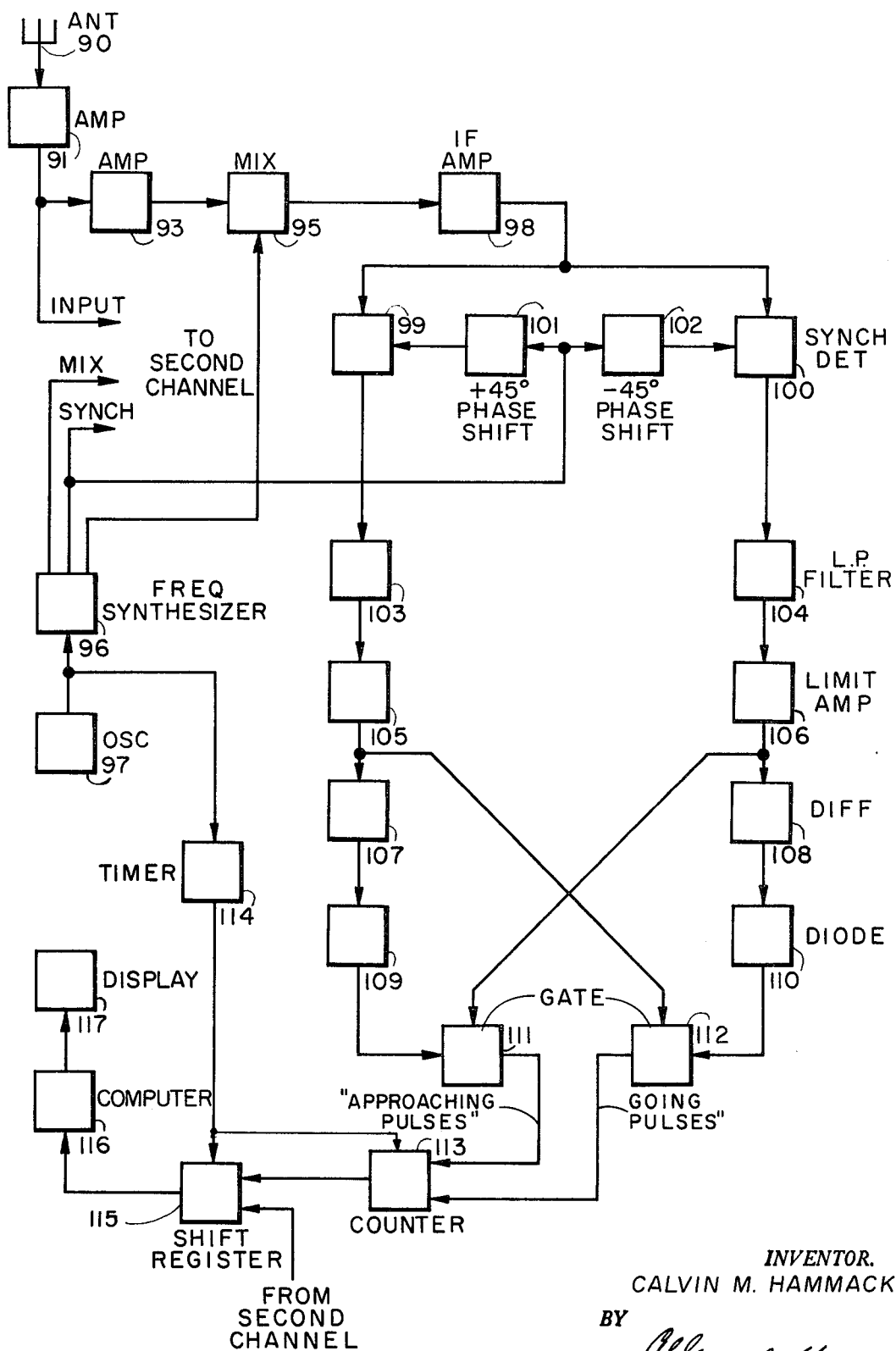
FIG_7

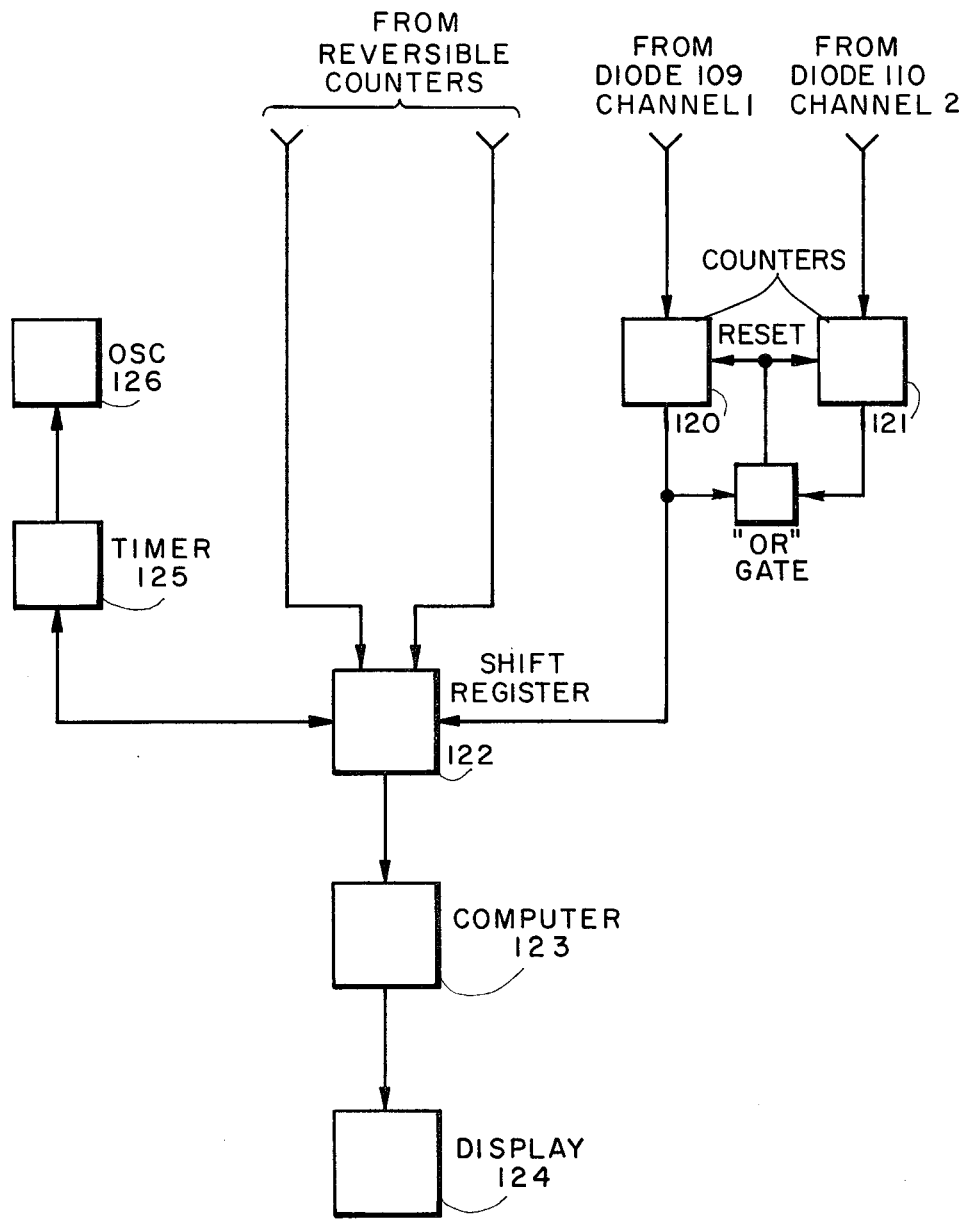
FIG_8

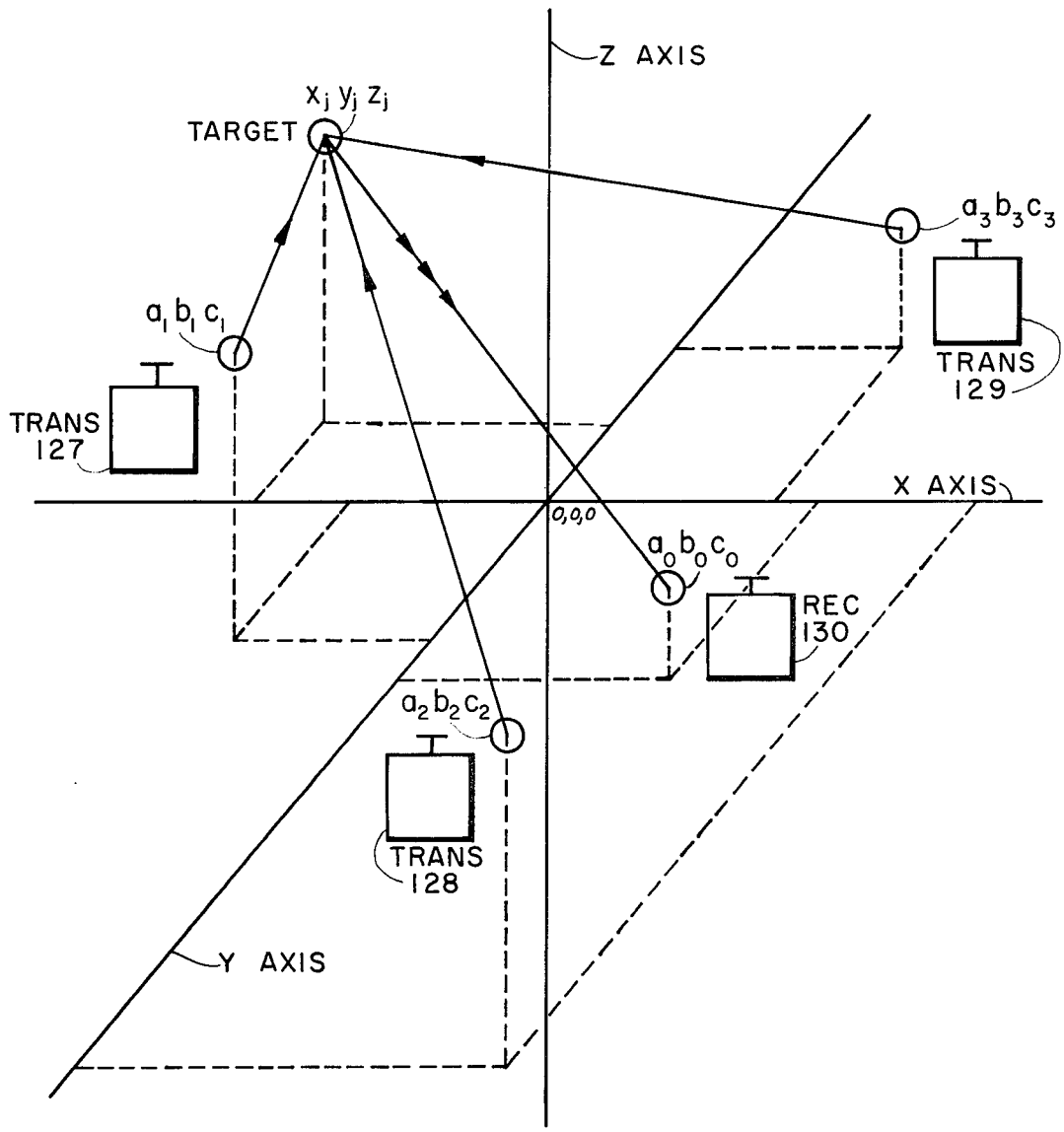
FIG_9

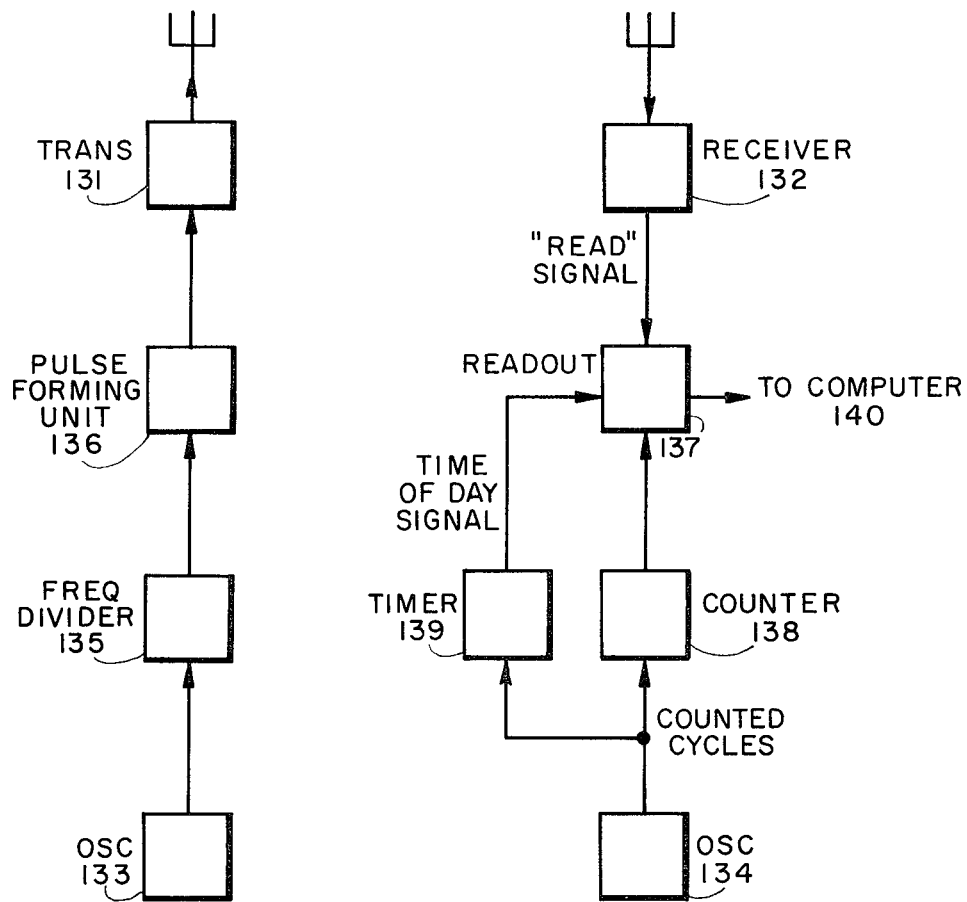
FIG_10

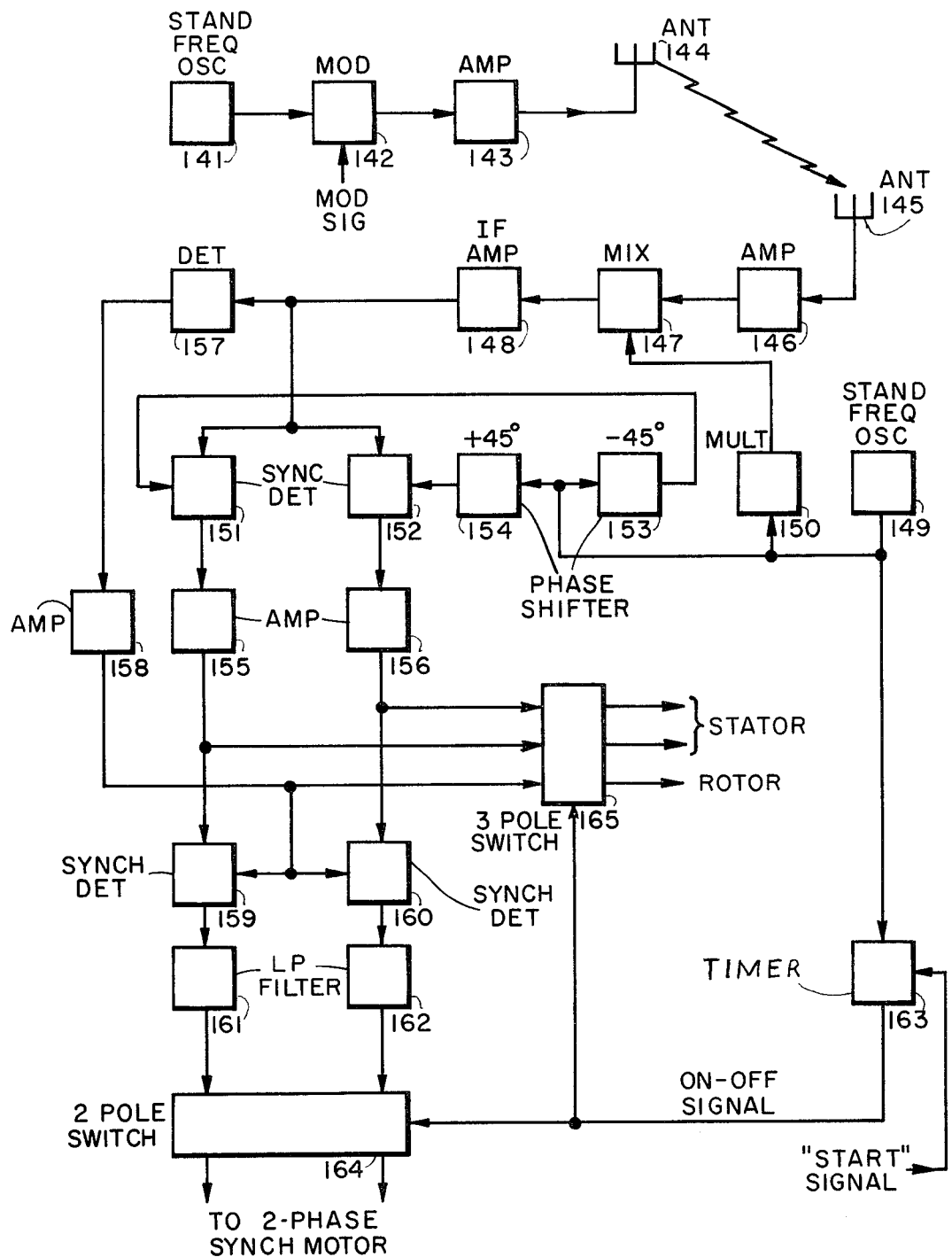
FIG_11

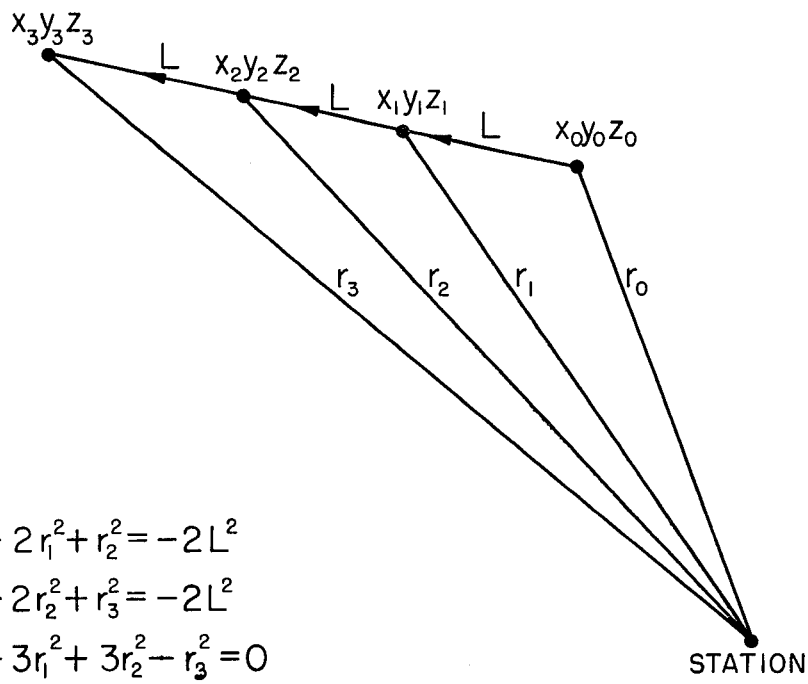
$$r_0^2 - 2r_1^2 + r_2^2 = -2L^2$$
$$r_1^2 - 2r_2^2 + r_3^2 = -2L^2$$
$$r_0^2 - 3r_1^2 + 3r_2^2 - r_3^2 = 0$$
$$\left. \begin{array}{l} M_1 = r_1 - r_0 \\ M_2 = r_2 - r_0 \\ M_3 = r_3 - r_0 \end{array} \right\} \text{MEASURED VALUES}$$
$$r_0^2 - 3(r_0 + M_1)^2 + 3(r_0 + M_2)^2 - (r_0 + M_3)^2 = 0$$
$$(-6M_1 + 6M_2 - 2M_3)r_0 = +3M_1^2 - 3M_2^2 + M_3^2$$
$$r_0 = \frac{1}{2} \frac{3M_1^2 - 3M_2^2 + M_3^2}{-3M_1 + 3M_2 - 2M_3}$$
SINGLE STATION UNIDOPPLER
LINEAR TRAJECTORY
CONSTANT SPEED
FIG—12
*INVENTOR.*
CALVIN M. HAMMACK
BY
ATTORNEY

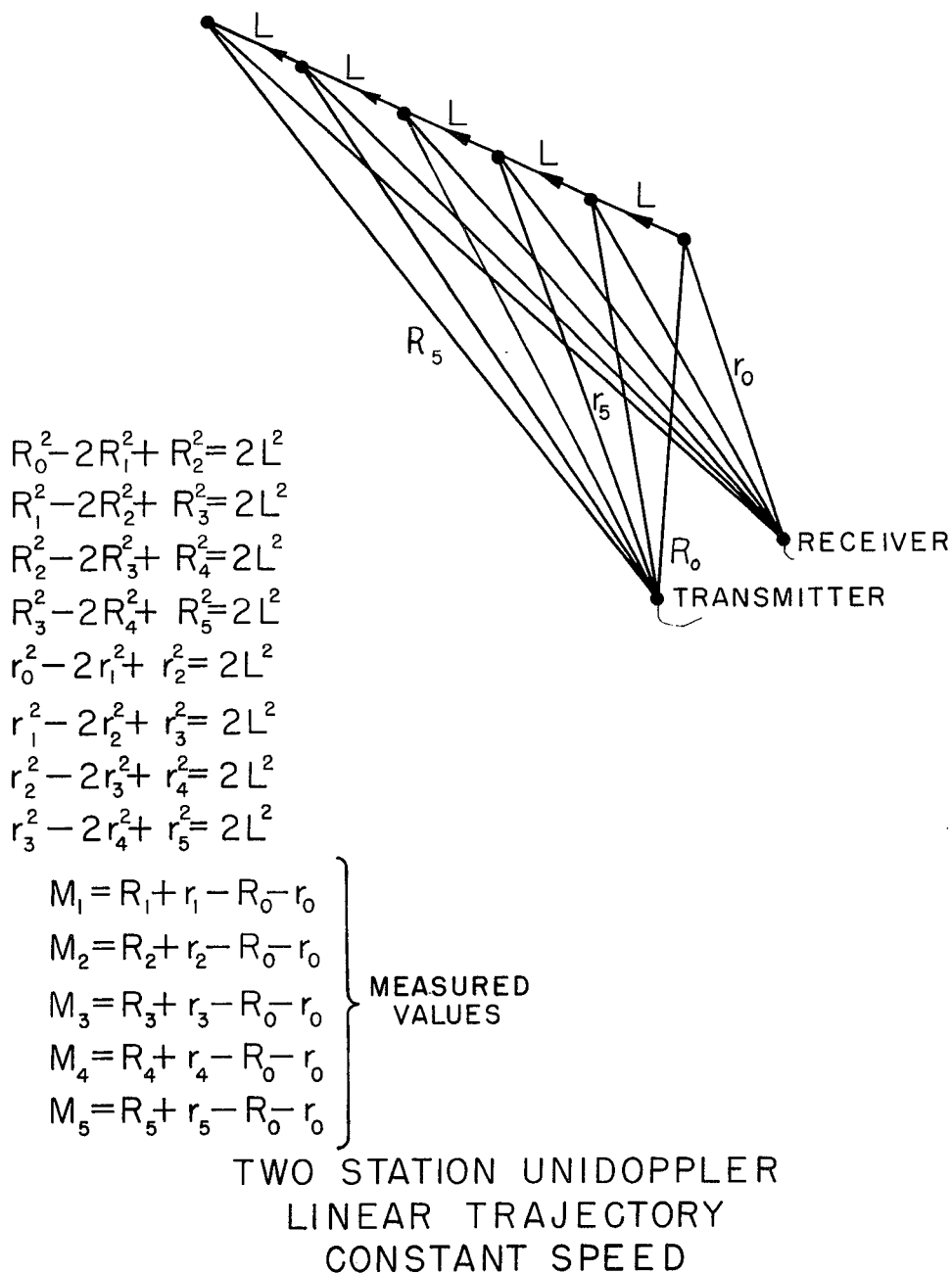

$$R_0^2 - 2R_1^2 + R_2^2 = 2L^2$$
$$R_1^2 - 2R_2^2 + R_3^2 = 2L^2$$
$$R_2^2 - 2R_3^2 + R_4^2 = 2L^2$$
$$R_3^2 - 2R_4^2 + R_5^2 = 2L^2$$
$$r_0^2 - 2r_1^2 + r_2^2 = 2L^2$$
$$r_1^2 - 2r_2^2 + r_3^2 = 2L^2$$
$$r_2^2 - 2r_3^2 + r_4^2 = 2L^2$$
$$r_3^2 - 2r_4^2 + r_5^2 = 2L^2$$

$$\left. \begin{array}{l} M_1 = R_1 + r_1 - R_0 - r_0 \\ M_2 = R_2 + r_2 - R_0 - r_0 \\ M_3 = R_3 + r_3 - R_0 - r_0 \\ M_4 = R_4 + r_4 - R_0 - r_0 \\ M_5 = R_5 + r_5 - R_0 - r_0 \end{array} \right\} \text{MEASURED VALUES}$$

TWO STATION UNIDOPPLER
LINEAR TRAJECTORY
CONSTANT SPEED

FIG__13

*INVENTOR.*
CALVIN M. HAMMACK
BY
*Allen and Chromy*
ATTORNEY

METHOD AND APPARATUS FOR AUTOMATICALLY DETERMINING POSITION-MOTION STATE OF A MOVING OBJECT

CROSS REFERENCES TO RELATED APPLICATIONS

This is a continuation-in-part of copending patent application Ser. No. 86,770, filed Feb. 2, 1961, now Pat. No. 3,706,096 issued Dec. 12, 1972, and Ser. No. 278,191, filed May 6, 1963, now abandoned.

Related applications of applicant include patent application Ser. No. 335,454, filed Dec. 5, 1963, now Pat. No. 3,242,487 issued Mar. 22, 1966 entitled Detection and Tracking of Multiple Targets; Ser. No. 289,609, filed June 21, 1963, now Pat. No. 3,286,263, issued Nov. 15, 1966 entitled Polystation Detector For Multiple Targets; Ser. No. 312,598, filed Sept. 30, 1963, now Pat. No. 3,270,340, issued Aug. 30, 1966 entitled Method of Echo Grouping; and Ser. No. 420,623, filed Dec. 23, 1964, now Pat. No. 3,445,847 issued May 20, 1969 entitled Method and Apparatus for Geometrical Determinations.

BACKGROUND OF THE INVENTION

In my Pat. Nos. 3,286,263, dated Nov. 15, 1966, No. 3,270,340, dated Aug. 30, 1966, No. 3,242,487, dated Mar. 22, 1966 and No. 3,445,847, dated May 20, 1969, it has been shown that it is possible to determine the position of one or more points relative to the position of other points by measuring changes or rates of change in the geometrical relationships of the points in question. My discovery of the principle of determining an instantaneous geometrical condition of measuring only the changes or the rates of change of some of the geometrical properties of the configuration is far reaching in its practical consequences. It is not necessary to obtain in some manner an initial preexisting geometrical condition to which the measured changes may be added to obtain the final geometrical condition; but one may obtain both the initial condition and the final condition, and conditions in between by only measuring, or otherwise determining, the changes occurring in the geometrical condition between the epochs of successive geometrical conditions.

It has been the practice in promulgating multistatic system alleged to make use of observations of the doppler shift for determining the position of an object in motion to make the assumption that the object being tracked is moving at a constant speed along a straight line. It is left to the assumption by the innocent that the same process may be extended to objects travelling along curved paths and otherwise undergoing acceleration. This assumption is sometimes reported by the statement that the duration of the Doppler measurement may be made over a small enough interval of time to make the approximation of straight line motion and constant speed sufficiently accurate for the purposes at hand.

In most practical applications these assumptions introduce enormous errors. It can be shown that no matter how short the duration of the doppler measurement the error resultant of assumption of straight line-constant speed does not approach zero in the sense of an infinitesimal. A finite error value is reached beyond which further reduction of the measurement interval results in no reduction of error. This irreducible error has been found to be completely disabling in numerical tests of practice situations.

In my copending application Ser. No. 86,770 filed Feb. 2, 1961, a method and apparatus employing four stations to make simultaneous doppler measurements was shown which performs entirely independently of any acceleration of no matter what order and of no matter what magnitude. At the time of filing of this patent application the impracticality of the straight-line constant speed assumption was already realized relative to all practical areas examined (orbital trajectories and bullet trajectories).

In the instant invention no reliance is placed on any particular knowledge of any coefficient of motion. The constant speed straight-line motion assumption implies that it is known a priori that the values of the acceleration, jerk, and higher order accelerations are known to be zero. No such straight line-constant speed assumption need be made in the practice or application of my invention, nor is it necessary to know the value of any acceleration of any order.

The assumption of straight line-constant speed motion is convenient in the introduction of the novice to the subject matter. Frequently the novice has difficulty in accepting my now well established concept that doppler information alone is sufficient for the definition of the position of a moving object. However, such assumption is grossly misleading in almost every area of practical application.

I introduced to the art purely doppler systems capable of position determination relying solely on simpler doppler type measurements without a priori knowledge of the trajectory or positions along the trajectory of the moving object (Patent application Ser. No. 86,770). My method was varied by Grimm et al. in Pat. No. 3,155,937 using four stations and the same type of measurement, but with the absolute limitation of straight line motion. Grimm et al. does not make reference to my prior disclosure (not having access to my application in the files of the Patent Office) and recites no advantage thereon.

My present invention uses only three stations under the same three-space conditions recited previously by Grimm et al. using four stations and straight line-constant speed assumption and earlier by myself using four stations but without any such limiting assumption.

The essential disadvantage of a multistatic position determining system is the very fact that it is multistatic. The additional logistics and real estate required when more than one station is employed mitigates heavily against such systems and in favor of single station (monostatic) systems. I believe the reduction in the number of stations offered by my instant invention to be of substantial value. Further value of my instant invention occurs when it is used as an ancillary element and as a backup system in combination with my previous invention.

SUMMARY OF THE INVENTION

An object of this invention is the provision of method and apparatus for determining the position and motion of accelerating objects such as vehicles, missiles, projectiles, meteors, and the like, using waves or quanta such as light waves, acoustic waves, radio waves, or the like. My invention makes possible the tracking of a moving object that is undergoing unknown accelerations, and the determination of the position and motion of such moving object.

An object of this invention is the provision of method and apparatus for position-motion determination of accelerating objects using fewer stations than employed by the prior art.

An object of this invention is to provide an improved automatic method and an improved automatic apparatus for multistatic doppler determination of the position-motion state of a moving object employing a reduced number of stations.

Other objects and advantages of this invention will become apparent from the following specification when read in conjunction with the accompanying drawings wherein:

FIG. 1 shows the layout of a three-station reflective system and the geometrical relationship between the system and the moving target object;

FIG. 2 is a block wiring diagram of one of the stations of a reflective three-station system employing differential measurements;

FIG. 3 is a block wiring diagram of one of the stations of a reflective three-station system employing incremental measurements;

FIG. 4 is a block wiring diagram of an apparatus for bidirectional digital counting of dopplier cycles;

FIG. 5 illustrates a two-station navigation system;

FIG. 6 shows the geometrical relationships of the two-station navigation and mapping system;

FIG. 7 is the block diagram of the circuit of one channel of the airborne receiving equipment of the two-station navigation and mapping system;

FIG. 8 is the block diagram of a counting circuit for deriving data for use with range change argument in the motion equations of the system;

FIG. 9 shows the layout of a four-station reflective system and the geometrical relationship between the system and the moving target object;

FIG. 10 shows the block wiring diagrams of the transmitting and the receiving equipments of a pulse system for performing incremental measurements;

FIG. 11 shows block wiring diagrams of the transmitting and receiving equipments of a system for performing incremental measurements employing modulated waves;

FIG. 12 indicates the geometrical relationships of a single station Unidoppler system in which the target is known to travel in a straight line at constant velocity; and FIG. 13 indicates the geometrical relationships of a two-station two-legged Unidoppler system operating with a target known to travel in a straight line at constant velocity.

Before referring to the drawings in detail, meaning of several terms employed in the description are set forth in the following section.

DEFINITIONS

MEASUREMENT

Much of a substantial region of embodiment of the instant invention is dependent upon the element of directly measuring the change of the instantaneous magnitude of at least one physical quantity. Such measurement of change is identical in its fundamental nature to the measurement of the distance travelled in an automobile by reading the odometer on the dashboard at a first epoch and at a second epoch. The difference of these two readings is commonly derived by subtraction. For the accuracy required in such a measuring the process of subtraction can be accomplished by a person of reasonable mental powers without the manipulation of a tool of any sort. The difference of the two readings so derived represents the distance travelled by the automobile between the two epochs. Neither of the two readings necessarily represents the total distance travelled by the automobile prior to that particular reading. It is obviously not necessary to measure or otherwise establish the total distance travelled by the automobile prior to either epoch in order to use the odometer to measure the distance travelled by the automobile in the time interval between the two epochs. Thus one does not measure the distance travelled prior to the first epoch and the distance travelled prior to the second epoch and then subtract the one from the other. Actually one measures nothing by reading the odometer at the first epoch. One merely performs a part of the total measurement process at this epoch by establishing the "zero" or reference value upon which the measurement is based. The measurement process is continuing between the first epoch and the second epoch. The measurement requires a finite length of time to perform, and the length of time is the time between the first epoch and the second epoch (discounting the time required for performing ancillary functions such as adjusting the equipment and securing it and recording the data).

Furthermore no information of value is obtained by the second reading without having the information derived from the first reading. Thus one can show that neither reading in itself constitutes a measurement since no significant information is imparted by a single reading without reference to some zero or other reference reading. The performance of two such readings at separate epochs however does provide a complete element of information having definite, understandable physical significance. To reduce this information to a single digital value instead of two digital values, each value has the result of a separate reading, the indicated subtraction is performed and the resultant number is commonly called the result of the completed measurement.

The concept that a measurement of the distance travelled by the automobile may be measured by performing successive readings is fairly well established. A measurement is performed, and a useful result of the measurement is provided by the process. The odometer is an essential tool, an essential artifact, without which the measurement cannot be performed. In all modifications and practical applications of the instant invention in which similar apparatus or method is used this function is performed entirely automatically without human intervention and any mental process mental step does not exist and indeed is difficult to conceive. Furthermore it is emphasized that the measurement may adequately be expressed in terms of two numbers; the reading at the first epoch and the reading at the second epoch properly labeled. The expression of the measurement value as a single number by subtracting one of the numbers either mentally or by machinery as is contemplated in this patent in no way influences the measurement itself and is a function really performed subsequent to the actual measurement if desired. A measurement has been performed whether or not the result of the measurement has been expressed as two digital numbers, neither number having physical significance by itself, or as a single number possessing the entire physical significance of the two numbers presented together. CClearly the essence of the measuring step does not lie in the ancillary subtraction.

It is most obvious that it is not necessary to perform two readings of the odometer in order to perform the measurement. One can set the odometer to zero at the first epoch and complete the measurement at the second epoch by merely reading the odometer. Thus there is no process of subtraction required to reduce the digital representation of the measurement value to a single digital number, and therefore this function performed automatically in my invention can be circumvented. Anyone skilled in the art would know that odometers may be readily set to zero, as desired. For example, some automobile odometers are provided with a trip indicator whereby the odometer may be set at zero at the start of the trip and whereby the length of the trip is directly indicated at the end of the trip.

There is no practical significance in the discussion of whether the initial value shown by the odometer is zero or some reference value. In either case the magnitude of the measurement is clearly indicated by the odometer either as one number or as by two successive numbers. It is also most obviously apparent that to determine this difference or change in distance only a single measurement has been performed. There are not two measurements of which the difference is determined. It is of course perfectly possible to determine the difference of distances by measuring two distances and performing the subtraction of one measured value from the other measured value to obtain the determined difference of distances. Such a measurement and subtraction process could also be performed where that difference of distance that is so derived is a change of distance. A measurement from a benchmark to a given object is measured as by a tape or radio means. The object is then moved and the distance from the bench mark to the moved object is again measured. The change in distance has been determined by a process of two measurements and a subtraction. Even here common parlance might permit of the statement that the difference of distance is measured, and this is not antithetical to the common use of the word in the technical community. However the applicant has avoided this use of the word measure to indicate the performance of two measurements the difference of which is derived or to indicate any other linear combination of two measurements.

The question of standards arises relative to the use of the word "measurement". Nothing in the use of the word measurement in this specification is intended beyond the common use of the word in the technical community. One "measures" the frequency of a signal. There are a number of ways by which this operation of frequency measurement is accomplished. One method is simply to tune a calibrated resonant circuit to the signal whose frequency is to be determined. Thus one probably measures directly only the angular degree of rotation of a dial or of the transverse of a linear indicator. The frequency itself must be derived by implicit computation relating the direct measurement of mechanical displacement to the standard with which it is to be compared. One may count the difference beat cycles between two signals, one the standard and the other the signal whose frequency is to be determined. To derive the frequency one must determine the time over which this count was performed and perform explicitly or implicitly the division required to determine the average number of cycles per second of the unknown frequency. It is rare indeed that one has a direct comparison of a standard of the same dimension and of the same qualitative character as the quantity that one desires to measure. One generally measures time by directly measuring the angular displacement of the hands on a watch face. Implicit measurement or indirect measurement is more the rule than is direct measurement, and the extent to which one regards a measurement as direct is more often than not a matter of divergent opinions. In a similar manner at the other extreme, the determination of quantities through processes that are quite involved, (and to the uninitiated, obscure) are still said to be measured (particularly by the expert) if the relationship between the measured quantity and the standard or standards are sufficiently firm and dependable.

Frequently a measurement is in reality a nonlinear combination of two other measurements. Area is rarely measured directly by taking a standard and calibrated area, of say cloth, and laying it down a number of times over the surface whose area is to be determined. Even this procedure would involve counting, a mathematical process, if the standard were to be used on an area greater than the standard area. Rather one generally measures two dimensions of the surface and by simple computation determines the area.

Webster's *New World Dictionary* defines a planimeter as an "instrument for measuring the area of a regular or irregular plane figure by tracing the perimeter of the figure." Where is the standard? Actually the device is a fairly complicated computing element. It is sensitive to both the rotation of a wheel in contact with the surface of the area being measured and the direction in which the instrument is moved. The instrument does not even measure the length of the perimeter which it traces. Yet this instrument is universally said to measure area. In this specification the applicant neither implies nor requires a definition of the term "measure" any more explicit than this common usage.

A measurement is frequently if not always dependent upon more than a single standard. Even if the standard of length is defined in terms of temperature and other conditions all of which constitute standards against which a measurement is performed. Furthermore, frequently these multiple standards are not qualitatively the same as that which is being measured nor the same relative to each other, i.e. "at standard temperature and pressure."

The measurement of the difference of two like quantities is an easy and simple concept and widely practiced in everyday living. The applicant does not use the term in any other way than it is used in such common practice. The difference must of course be in terms of the same units. (feet, seconds, grams) as the two quantities whose difference is to be determined. This difference may be between two quantities that are not coexistant in time in which case one may refer to the change in a quantity. Here again the subject is extremely simple and no further meaning is attached to this word by the applicant than this very common usage.

The word "reading" is reserved for the value of the measured quantity at the termination of the individual measurement, not necessarily at the termination of the measurement sequence. Measurement may be employed to indicate the process resulting in a reading.

The "changes" and "rates of change" referred to in this application are changes and rates of change occurring with respect to time, unless otherwise stated.

The words "measurement group" refer to the totality of all of the measurements required for the complete determination of a position or dimension of the position-motion state.

The word "variation" in this application is employed to mean incremental changes or to mean rates of change, either of which variations occur with respect to time.

The words "a priori" are used to designate known information other than that of the dimensions or measurement of the system that may be employed to provide complete or partial bounding or determination or resolution of ambiguities. Such information may concern the characteristics of motion of a moving object.

The word "bound" is employed in this application to indicate the partial determination of position or motion, the restriction thereof, or the determination of one or more coordinates of position or motion.

A "significant point" or a "significant epoch" is the point or epoch at or corresponding to the initiation or termination of a measurement of incremental change and represents the location of physical items such as reflecting objects or apparatus of the system.

The word "epoch" is used synonymously with the words "point in time". It is the interval of time in which a sequence of the method of the process is initiated or terminated for example. The duration of an epoch is presumed to be so limited that there are no significant changes in the geometrical properties of the system. This usage is resorted to to limit the use of the word "point" to mean a location in space at which equipment, reflecting objects, or the like has been located, is located, or will be located, or which is traversed by such equipment or other objects.

In connection with doppler measurement two common definitions of the "Doppler Effect" may be enlightening:

"The change in the apparent time interval between two events that arises from the motion of an observer, together with the finite velocity of transmission of information about the events."    T.P. Gill, *Doppler Radar* 1965

"The apparent change of frequency of sound waves or light waves, varying with the relative velocity of the source and the observer."    Webster's *New World Dictionary* 1951

Quite obviously neither definition is comprehensive of common usage.

It should be made clear that common in the art are two somewhat different descriptions of doppler measurements: one may be described as a rate or instantaneous measurement, the other may be described as a displacement or incremental measurement. Both types of measurement are recited in the instant specification since the principle of my invention is independent of whichever type of doppler measurement is specified, The "changes" and "rates of change" referred to in this specification are changes and rates of change occuring with respect to time, unless otherwise stated.

MULTIPLE RATE FINDERS

A practical embodiment of my invention, shown in FIG. 1, is a simple system designed to track a single aircraft or space vehicle without relyng on equipment placed aboard the vehicle. This system may be placed to practical use for obtaining the position of a missile where it is desired to eliminate entirely, for weight reduction purposes, the need for additional equipment to be carried aboard the tested missile. Another application may be in blind landing of aircraft where it is desirable from the point of view of maintenance and reliability for all of the active equipment of the system to be on the ground. This system also may be employed in tracking applications where the highest accuracy is desired.

The actual detecting equipment consists of three fixed transmitter-receiver stations designated as stations 1, 2, and 3 in FIG. 1, each of which is capable through radio means of detecting the first, second, and higher time derivatives of the range between that station and the moving target. For tracking targets moving in three dimensions the three stations must not lie on a straight line. While it is true that a wide variety of means for making these measurements is available from the current practice, the system shown is chosen for its simplicity and practicality and it is not desired to restrict this invention to the embodiment illustrated.

Each of the stations 1, 2, and 3 is identical to the others and consists of a transmitter to illuminate the target and a receiver tuned so as to receive signals reflected to it from the target. The receiver of a particular station is tuned to receive signals whose frequencies are near but not equal to the frequency of the transmitter of that station. Each of these stations is adjusted to its own separate and distinct frequency so as to prevent the reception of the signals transmitted by one station of the group by the receiver of another station of the group. Each station then makes completely independent measurements of the time derivatives of the range from that station to the moving target missile simultaneously with the other two stations of the system. The recorded values of the measured quantities are then transmitted by each station to a central point 4 where the position of the target, its total velocity, its total acceleration, and so forth are calculated.

In FIG. 2 there is shown a diagram of connections for one of the three stations shown in FIG. 1, and each of the stations 1, 2 and 3 is connected as shown in FIG. 2. It is seen that the transmitter and the receiver share a common local frequency standard oscillator 5 which may be a piezoelectric crystal-controlled oscillator or any other type of frequency stabilized oscillator. The use of a common oscillator 5 for the transmitter and the receiver eliminates the effects of small frequency drifts which might occur in the oscillator of either transmitter or receiver were these components to have separate oscillators, and thereby increases the practical precision with which the fundamental measurements are made. Separate antennas 6 and 7 so arranged as to provide a minimum of coupling between them are employed for the receiver and transmitter.

Operation of each of the stations is as follows: The signal from the standard frequency oscillator 5 is amplified in the transmitter amplifier 8 and radiated into space through transmitter antenna 7. The emitted signal is a monochromatic continuous wave with mo modulation whatever imposed upon it. The signal transmitted is changed in frequency upon being reflected by an object having a component of motion in the direction of the station. As a consequence of this change in frequency upon reflection from a moving target the signal so reflected, upon returning to the station from which it was transmitted, is different from the frequency of the emitted signal. It is precisely this difference in frequency which provides a measure of the velocity of the target in the direction of the station.

The returning signal changed in frequency by the doppler effect enters the receiver through receiving antenna 6 and enters mixer 9 where it is mixed with a signal derived from frequency standard oscillator 5 through frequency translator 10. The frequency translator 10 is a device common in the art and sometimes known as a frequency synthesizer. This device employs as its input a standard frequency signal and provides as its output a signal whose frequency is stabilized by the standard frequency signal but is different than the standard frequency. The amount of the frequency translation is always a rotational fraction of the frequency of the standard signal. The translator or frequency synthesizer contains no internal frequency standard of its own. All mixing signals employed within the translator are derived from the input signal from the frequency standard oscillator 5.

The signal output from the frequency translator 10 injected into mixer 9 is removed or translated from the frequency of the signal emitted by the transmitter antenna 7 by a fixed value known variously as the "offset frequency", the "bias frequency", or the "intermediate frequency". The signal output from the mixer 9 contains a signal whose frequency is the sum of the offset frequency and the difference in frequency between the signal emitted by the transmitter antenna 7 and the signal received by the receiver antenna 6. This difference frequency is sometimes known as the "doppler frequency".

The output of mixer 9 is passed through band pass filter 11 which passes signals whose frequencies are in the neighborhood of the offset frequency and rejects the higher harmonics of these frequencies. The output of the band pass filter 11 is fed into band rejection filter 12 which is sharply tuned to reject the signal that is present because of stationary targets and leakage between the antennas. Band rejection filter 12 is tuned to reject this frequency which is the offset frequency and transmit signals of all other frequencies. The output of rejection filter 12 is amplified in amplifier 13 and fed into frequency meter 14, whose output may be either digital or analog and whose output provides a direct indication of the frequency of the signal from the amplifier 13. The signal from amplifier 13 is also fed into frequency discriminator 15 which is tuned to the offset frequency and whose "direct current" output voltage is proportional to the doppler frequency. If the target is approaching the station the voltage output of the frequency discriminator 15 is negative. If the target is moving away from the station the output voltage of the discriminator is positive.

The output of the frequency discriminator 15 is fed through amplifier 16 to signal differentiator 17. Signal differentiator 17 is the first of several identical signal differentiators 17, 18 and 19 connected in tandem hrough identical amplifiers 20 and 21. In addition to being fed into the succeeding differentiator the output of each amplifier is fed to an indicator such as indicator 23, which is identical to the other indicators 24 and 25. These indicators may be simple voltmeters. The art of observing and recording the readings of such indicators and of the frequency meter 14 is well known. The readings of these meters form the fundamental output measurement of the system at any instant of time. It must be remembered that the reading of the frequency meter 14 includes the value of the offset frequency. For use in determining the velocity of the target one is interested in determining the doppler frequency. To obtain the doppler frequency the value of the offset frequency is subtracted from the value of the reading of frequency meter 14. The readings of indicators 23, 24 and 25 are not affected by the offset frequency.

The readings of the frequency meter 14 and indicators 23, 24 and 25 are proportional to the velocity of the target in the direction of the station and of the first, second, third and higher derivatives respectively of the velocity of the target in the direction of the station. The dials or charts of the indicators may be calibrated in terms of velocity, acceleration, jerk, and so forth if desired. The radial velocity of the target is defined here as that component of the total velocity of the target which lies along a line joining the target and the station and pointing away from the station. The radial velocity is related to the doppler frequency shift in the following manner:

$$V = (f_o - f_e) \, C/(f_o + f_e)$$

Where:
$V$ is the radial velocity
$f_o$ is the frequency of the emitted signal
$f_e$ is the frequency of the signal reflected from the moving target to the receiver antenna
$C$ is the velocity of propogation of the radio waves
$\mp |f_o - f_e|$ is the frequency shift owing to the motion of the reflecting target in the direction of the station. The upper sign applies if the target is approaching the station. The lower sign applies if the target is receding from the station.

The equation may be rearranged to show the frequency shift as a function of the radial velocity as follows:

$$f_o - f_e = 2 f_{are} \, (V/C) \, [1/(1 - V/C)]$$

Since the radiated frequency is controlled by the local standard oscillator of the station, it is seen that the measured frequency shift is a very accurate indicator of the radial velocity of the reflecting target. Frequency of one part in ten billion is readily obtainable in the modern art.

Differentiating with respect to time the expression for velocity in terms of frequency, one derives the following expressions for successive derivatives of the radial velocity $$\dot{V} = dV/dt = -2 f_o \dot{f}_e C/(f_o + f_e)^2$$

$$\ddot{V} = \frac{d^2v}{dt^2} = \frac{4\dot{f}_e{}^2 - 2\ddot{f}_o(f_o+f_e)^2}{(f_o+f_e)^3} f_o C$$

$$\vdots$$

Though these expressions appear to be complicated they may be approximated by others that are much simpler when the velocity of the vehicle is small compared to the velocity of the propagation of the radio waves:

$$\dot{V} = -(C/2f_o) \dot{f}_e$$
$$\ddot{V} = (C/2f_o) \ddot{f}_e$$
$$\dddot{V} = -(C/2f_o) \dddot{f}_e$$
$$\vdots$$

Using the readings of radial velocity and the time derivatives of radial velocity, all measured simultaneously at all of the stations, one is able to calculate the position of the vehicle at the time of the measurements. All of the time derivatives of the position may also be calculated. These calculations rest upon the assumption that all the measurements are made simultaneously. In practice it is not possible to attain perfect simultaneity between the observations at the three stations. In practice independent clocks operating at points separated by the Earth's diameter are capable of maintaining a timing error of less than a thousandth of a second. The recent literature quotes timing errors of a few microseconds. The degree of simultaneity required in making the measurements at the three stations depends in part upon the complexity of the motion of the object being observed.

Calculation of the position from readings of the velocity and the derivatives of the velocity rests upon the closeness of the assumption that the number of time derivatives of the motion of the target along the coordinate axis is finite and that the value of each of the corresponding time derivatives of the ranges is measurable. Zero values are not excluded but that value or values near it must be determined with the same accuracy as any other value. The method of calculation is simply to determine the time derivatives of the pythagorean relationship between the range from the observing station to the target $r$, the cartesian coordinates of the station $a, b, c$, and the cartesian coordinates of the target $x, y, z$, respectively. The first few of these equations are as follows:

$$r^2 = (x-a)^2 + (y-b)^2 + (z-c)^2$$
$$r\dot{r} = (x-a)\dot{x} + (y-b)\dot{y} + (z-c)\dot{z}$$
$$r\ddot{r} + \dot{r}^2 = (x-a)\ddot{x} + (y-b)\ddot{y} + (z-c)\ddot{z} + \dot{x}^2 + \dot{y}^2 + \dot{z}^2$$
$$3\dot{r}\ddot{r} + r\dddot{r} = 3\dot{x}\ddot{x} + 3\dot{y}\ddot{y} + 3\dot{z}\ddot{z} + (x-a)\dddot{x} + (y-b)\dddot{y} + (z-c)\dddot{z}$$
$$4\dot{r}\dddot{r} + 3\ddot{r}^2 + r\ddddot{r} = 4\dot{x}\dddot{x} + 4\dot{y}\dddot{y} + 4\dot{z}\dddot{z} + 3\ddot{x}^2 + 3\ddot{y}^2 + 3\ddot{z}^2 + (x-a)\ddddot{x} + (y-b)\ddddot{y} + (z-c)\ddddot{z}$$
$$\vdots$$

As many of these equations may be written as are necessary, and a set of these relationships exists for each of the tracking stations of the system. The unknowns of these equations are the cartesian coordinates of the target position and the derivatives of these coordinates with respect to time. It is desired to determine some or all of these unknowns, and such a determination may be made when the number of independent equations available for the calculation equals or exceeds the number of unknowns.

Counting the number of unknowns and the number of equations in the set of equations described above shows that the total number of unknowns exceeds the number of equations by three no matter how high the order of the equations taken to make up the set. Adding the equations corresponding to the next higher derivative also adds three new unknown derivatives, one for each coordinate axis. The number of unknowns and the number of equations may be made to balance by the introduction of additional information. Such additional information may be achieved through the use of an additional station. This method is described in my previous patent application Ser. No. 86,770. This application concerns other methods of making the measurements and calculations required to find the values of the unknowns. Another method introducing additional information is through constraint of the motion of the moving object. For instance, if it is possible to restrain the motion of the moving vehicle to a single known plane or to know that the motion is confined by natural or other forces to a plane, it is possible to balance the number of equations and the number of unknowns simply by adding to the equation set the equation of the plane of motion and the appropriate number of derivatives of the equation. The equation of the plane and the first few time derivatives are as follows:

$Ax + By + Cz = 1$
$A\dot{x} + B\dot{y} + C\dot{z} = 0$
$A\ddot{x} + B\ddot{y} + C\ddot{z} = 0$
$A\dddot{x} + B\dddot{y} + C\dddot{z} = 0$ If the constants of the equation of the plane and the derivatives of that equation, A, B and C are known it is only necessary to measure the first two derivatives of the ranges from the moving target to each of the three stations in order to attain a solvable set of equations. There are then a total of nine equations and a total of nine unknowns. Each additional set of derivative measurements adds four equations to the total number of available equations rather than three as before. Thus if an additional derivative of range is measured by each of the three stations an additional group of four equations is available while only three new unknowns, the corresponding derivatives of the three cartesian coordinate, are added to the total number of unknowns involved in the equation set. If the constants A, B, and C in the equation for the plane are not known additional derivatives of the ranges may be measured to provide the required number of additional equations. Thus the equation of the plane of motion may be determined as well as the other unknowns if desired. All the time derivatives of range up to and including the fifth must be measured in this method. If desired one may reduce the number of unknowns by one and the number of equations by one by eliminating the first equation, the equation of the plane in terms of the cartesian coordinates. Division by one and the same constant in each of the remaining planar equations reduces the number of unknown planar constants by one. The number of derivatives of range that must be measured remains five. Many variations of this method are at once apparent and it is not possible to include them all here.

It is of importance to note that this method concerns only the motion of the target object at the time of the measurements. The motion of the target at other times than the instant of measurement has no effect upon this method of determining the position and motion at the instant of measurement. The time derivatives of a single order may be expressed as a vector. In the sense of this explanation the restriction of the motion of the target to a plane means that all of the vector derivatives of the target coordinates lie in a single plane. A sample of such a condition of target motion exists commonly in the case of a mortar shell when there is no wind component at right angles to the path of the shell. The derivative vectors of higher order than those required to form a solvable set of equations may have any magnitude and any direction.

If it is not known whether or not all of the derivative vectors lie in a plane, derivatives of the sixth and higher order may be measured and one or more of the additional equations thus obtained substituted for one or more respectively of the equations employed for the case when only the derivatives to the fifth order are measured. In this manner it is possible to obtain two or more independent determinations of the position or other of the unknowns. If these determinations result in the same values there is a strong probability that the assumption of planar motion is valid. It is also possible to employ these additional measurements and the additional relationships thereby made available to determine the most probable plane of motion by the method of least squares. The techniques of least square solution is well known and generally apply when redundant data is available. It is merely necessary here to point out that such redundant data is made available by making the additional measurements.

If the vector of the first derivatives of the cartesian coordinates and the vector of the second derivatives and the vector of the third derivatives all lie in the same direction it is only necessary to measure the first three time derivatives of the ranges. Furthermore it is only necessary that the vectors of the derivatives up to and including the third lie in the same direction. Vector derivatives of higher order may lie in any direction and be of any magnitude. The condition thus described is one in which the vector of the acceleration on the moving object lies in the direction of the velocity of the object and the vector rate of change of the acceleration on the object also lies along the velocity vector of the object. It is of interest to note that under these conditions an extra equation is available providing redundancy without the necessity of making measurements of the higher derivatives of the ranges.

There are numerous other constraints that may be applied to bound the motion at the instant of measurement. Each of these restraints is expressed as equations involving the coordinates of the moving target or the time derivatives of these coordinates. When a sufficient number of equations involving the measurements made by the three stations and the constraints on the motion of the target are obtained one has the conditions required for a solution. The word "motion" is employed here to refer to all of the derivatives of the position coordinates. Though this explanation has been presented in terms of cartesian coordinates for simplicity it is not intended to restrict my invention to the use of such coordinate system as obviously the method may be employed using any coordinate system. Furthermore it is readily seen none of the stations of the system need remain stationary as it is only necessary to know the positions and motions of the stations and insert this data into the equations to obtain solutions as with stationary stations.

Some constraints on the motion of the target object may be applied without the necessity of adding equations. Such restraints are merely the setting of some of the components of the motion equal to zero or a known value. It is only necessary to determine in some manner that three of the derivatives of the coordinates of the moving target are zero or to determine their values. If a single derivative vector of any order is known there is enough information for position determination provided the derivatives of the ranges up to and including that same order are known. If three of the derivatives of a single coordinate are known there is sufficient information for a determination of position when the derivatives of sufficiently high order of the ranges are known. The three derivatives whose values must be known or zero may be of any orders and may be the derivatives of any of the three coordinates.

As a sample of this condition the third derivatives of the three coordinates may be zero. Such a condition would exist when an object has constant acceleration in one direction. An object in ballistic motion approximates this condition if the resistance of the air is negligible and the gravitational field may be regarded as uniform. To solve this problem it is necessary to measure the first three time derivatives of the ranges to the three stations. The derivatives of the target position coordinates of higher order than the third may be of any value as they do not affect the solution of the problem.

DISPLACEMENT FINDERS

In this embodiment of my invention the measurement performed at each station is that of radial displacement of the moving target toward or away from the measuring station. A finite increment of the distance from the target to the station is measured rather than the derivatives of this distance with respect to time. This displacement, positive or negative, occurs over a finite length of time rather than over an infinitesimal length of time. The object whose position is to be determined moves a finite and appreciable distance during the course of the measurement rather than an infinitesimal distance as described in the previous embodiment. This measurement is not a measurement of rate or velocity or the derivatives thereof but is a measurement of the range difference or change in range of the target from a single station. In the determination of the position of a moving object the change of range is noted at each of a number of consecutive points along the path followed by the moving object. The coordinates of any or all of these points may be determined employing the methods of my invention.

The configuration of the system is identical to that of the previous embodiment and illustrated in FIG. 1. The station equipment is different from that of the previous embodiment in the manner in which the signal from the receiving antenna is processed in the receiving equipment. The diagram of the equipment of each of the three stations is shown in FIG. 3.

The local standard oscillator 30 determines the frequency of the radiated wave as is also the case in the apparatus shown in FIG. 2. The output of the local standard oscillator is amplified by the transmitter power amplifier 31 and is fed to the transmitter antenna 32 from which it is radiated into space. The signal is reflected, with its frequency changed by the moving target, and enters the receiving system through receiver antenna 33. The signal from the antenna 33 enters the receiver mixers 34 and 35 where it is mixed with signals of the same frequency as that of the transmitted signal and ninety degrees out of phase with each other. In this system two channels are employed in the receiver in order to provide a sense of direction. The mixing signals are very much larger in amplitude than the signals resulting from leakage between the two antenna systems. Thus these residual signals from the transmitter do not appreciably affect the phase or amplitude of the mixing signals.

The mixing signals are derived from the local standard oscillator 30 through phase shifting circuits 36 and 37. One of these phase shifting circuits advances the phase of the mixing signal 45° and the other phase shifting circuit retards the mixing signal by 45°. The output signals from the mixers 34 and 35 are of frequency equal to the difference between the frequency of the transmitted signal and the frequency of the received signal entering the antenna after reflection by the moving target. The frequency of the signal coming out of each of the mixers is the same as that of the signal coming out of the other mixer, and these signals are ninety degrees out of phase with each other. There are of course signals of frequencies equal to the sums of the frequencies of the input signals and multiples thereof however these signals are rejected by succeeding amplifiers and filters.

If the target is approaching the station the frequency of the signal from the antenna 33 is higher than the transmitted frequency which is also the mixing frequency, and the corresponding signal output of one of the mixers will be ahead of the other. Which mixer leads is dependent on the polarity of the various connections and is easily changed by reversing the connections of the mixing signals. When the target is receding from the station the relative phase of the outputs of the mixers is reverse and the one that was leading before is now lagging. The relative phase of the signals coming from the two mixers is then an indication as to whether the target is approaching the station or receding from it.

The outputs of the mixers 34 and 35 are amplified by amplifiers 38 and 39. These amplifiers have their high frequency cutoff adjusted to eliminate the sum frequencies from the mixers and have a bandwidth adequate to handle all of the expected difference frequencies arising from targets of expected velocities. The amplifiers contain amplitude limiting circuits so as to provide output signals of nearly constant amplitude. The outputs of amplifiers 38 and 39 constitute a two phase signal with a neutral ground. The direction of rotation of this two phase signal indicates whether the target is approaching or receding from the station. Each revolution of the signal is indicative of a change in the distance to the target of one-half wavelength of the transmitted wave. The change of range is then measured by noting the amount of rotation of this two-phase signal from the amplifiers. Indication of this phase change or signal rotation may be obtained electronically by supplying these signals to the magnetic deflection coils 40 and 41 of a cathode ray tube (not shown) so that bright spot on the screen is moved in a circle either clockwise or counterclockwise depending on the rotation of the two-phase signal. On the other hand a very satisfactory electromechanical device similar in all respects to a two-phase synchronous motor employing two windings 40 and 41 in space quadrature may be used instead of the cathode ray tube, and the signal from one amplifier 38 is applied to one winding 40 and the signal from the other amplifier 39 is applied to the other winding 41. The rotor 42 consists of a small permanent magnet, and the rotation of this magnet indicates the sense and the magnitude of the displacement of the target relative to the station.

Since both the radiated signal and the mixing signal are from the same frequency standard the only error produced in the measurement of the incremental range by an error in the local standard oscillator 30 is proportional to the error in the oscillator frequency. This situation is in sharp contrast to systems where the dependence is placed in the stability existing between two separate oscillators operating at positions remote from each other. Other systems so dependent are described in this application.

When the output supplied to the two-phase motor shown in FIG. 3 is of a rather high frequency, such as may be impractical for use to energize this motor, a circuit such as shown in FIG. 4 may be used for converting the outputs of the amplifiers 38 and 39 into command signals to be fed into a reversible electronic counter of conventional construction. This circuit includes two branches, the right hand branch is connected to 38a of the amplifier 38 and comprises apparatus 62 for converting the output of the amplifier into a square wave which is fed to the differentiating circuit 64. The pulses derived from the differentiating circuit are fed to the diode circuit 66 which cuts off the negative pulses and the positive pulses are fed through the AND gate 68 to the electronic counter. The left hand branch is fed from terminal 39a of the amplifier 39 and includes as in the other branch, a squaring circuit 61, a differentiating circuit 63, a negative cutoff circuit 65, and an AND gate 67. One input of the gate 68 is connected to the output of the square wave circuit 61 and likewise one input of the gate 67 is connected to the output of the square wave circuit 62.

A reversible step motor may be actuated from this circuit if desired. The circuit for operating the reversible step motor assembly 75 and 76 is also shown in FIG. 4. The reversible step motor assembly 75 and 76 has two step motors 75 and 76 connected to the same shaft 77. One step motor is so arranged that when it is fed a pulse of the proper shape it rotates the shaft a fixed angle in one direction. The other motor operates in the same manner to rotate the shaft by the same amount in the opposite direction when it is driven by a pulse of the same shape. The shaft may be connected to any conventional register 78 odometer type indicator such as sold by Veeder Root Co. Two pulse shaping circuits 73 and 74 are employed to drive the step motors 75 and 76 as shown. These circuits provide the actual energy required to drive the motors. These driving circuits 73 and 74 operate upon receiving command pulses from the AND gates 67 and 68 respectively.

With the equipments described in FIG. 1, FIG. 3, and FIG. 4 one may obtain an approximate measurement of rate of change of range by taking the measurement of a small enough time interval and dividing by the time required for the measurement. Successive measurements may be taken to obtain approximations of higher time derivatives of range.

In FIG. 3 the timer 43 determines the interval over which the cycle counter 44 operates before a reading is taken. The timer 43 actuates a signal device 45 each time a reading of the cycle counter 44 is to be taken. If the motion of the vehicle is very rapid, or if for any other reason, it is desired to employ an automatic readout system the timer 43 will provide the signal to actuate the readout mechanism 70 as shown in FIG. 4 associated with the reversible counter 69. These readout mechanisms are common in the art. They are commercially available for both electronic and mechanical pulse counters. Such a readout provides a permanent record of the reading; and in addition usually provides a coding symbol or number so that the reading may be later identified. This coding may consist of the numerical indication of the time at which the reading is taken. The readout may make its record on paper tape, magnetic tape, magnetic core matrix, or any other memory device. In high speed work appropriate shift registers may be employed between the counting circuit and the recording mechanism. Data can be stored in the shift register before direct introduction via communication circuits into the computer memory for immediate computation.

MATHEMATICS FOR MULTIPLE DISPLACEMENT FINDERS

For each of the three stations of the system and relative to each of the positions occupied by the target at the time that the measurements are started and at the successive times when readings are taken the following equation can be written:

$$(x_j - a_i)^2 + (y_j - b_i)^2 + (z_j - c_i)^2 = r_{ij}^2$$

Where:

$i = 1, 2, 3$ designates the station $j = 0, 1, ....$ designates target position $x_0 y_0 z_0$ are the cartesian coordinates of the position of the target at the beginning of the measurement sequence $x_j y_j z_j$ are the cartesian coordinates of the position of the target at the time of the $j$th reading.

$a_i b_i c_i$ are the cartesian coordinates of the $i$th station.

$r_{ij}$ is the slant range from the $i$th station to the position of the target at the time of the $j$th reading.

$r_{i0}$ is the slant range from the $i$th station to the position occupied by the target at the initiation of the measurement sequence.

$M_{ij} = r_{ij} - r_{i0}$ is the range increment between the range from the $i$th station to the position occupied by the target at the beginning of the measurement sequence and the position occupied by the target at the time of the $j$th reading.

By taking a sufficient number of readings of range increments over any interval of the path of the target it is possible to determine the positions occupied by the target at the times of the readings to an accuracy that is limited only by the accuracy of the primary measurement of the range increments. It is to be emphasized that the three stations make their measurements simultaneously. Error in the timing between stations is reflected in error in the determination of the positions of the target. In general the effect of an error of timing of a given magnitude between stations increases as the velocity of the target is increased. For the purpose of this initial explanation it will be assumed that the timing between stations is perfect.

No matter how many readings of range increments are taken it is impossible to determine the values of the unknown target positions along the target path using these equations alone as is possible when four stations are available. Other relationships must be employed to provide the additional equation required to make up a complete set of solvable equations. These additional equations may come from several sources of information concerning the path of the target and the accuracy of the methods of performing the measurements. If it is known that the object behaves in some predictable manner so that a set of equations having a finite number of significant terms and unknown constants can be written to describe the path or some characteristic of the path these equations may be added to those derived directly from the measurements of the range increments to produce solvable sets of independent simultaneous equations. A sample of such path equations is the ellipse travelled by an earth satellite. It is sometimes more important to determine the constant parameters of such an equation than to determine the actual instantaneous coordinates of the target. This technique becomes complicated when it is necessary to include the effects of air resistance, distortion of the gravitational field owing to the Earth's shape, the tides and the moon, and the effects of radiation pressure. The simple ellipse is then no longer applicable. These techniques are heavily dependent upon ability to determine the characteristics of the forces involved and to express these relationships in sufficient mathematical detail. It is not necessary to possess this specialized information to merely determine the present position of the target at the times of the measurements. It is possible to write more general equations not dependent upon specialized knowledge of the motion of the target, which when combined with the equations derived directly from the measurements of the range increments will provide solvable sets of independent equations. The accuracy of this method is limited only by the amount of the data taken and the accuracy of the measurements.

In this general technique, a finite number of readings N is taken by each of the three stations over an interval of the motion of the target. There are thus associated with this set of readings the same number N plus one positions of the target. The initial position of the target occurring at the time the series of measurements is commenced accounts for the number of target positions associated with the measurement set being one greater than the number of readings taken. The errors in the measurements of the range increments are assumed to be random and that the average error is known. It is assumed that the path of the target is continuous, but that no further information concerning it is available nor is any starting point or other position along the path known. The readings are taken sufficiently often that the increment of the change of range between two successive measurements at any station is never greater than the average error expected in the measurements. Data may be taken at closer intervals if desired. The frequency of the measurements is thus dependent upon the velocity vector of the target. Because of the random nature of the errors in the measurement of the change of range and because no other information is provided concerning the path of the target it is necessary to assume that a true curve passing through all of the positions occupied by the target at the epochs of the various readings could not be of degree less than the number of readings taken. This number is finite even though the actual motion of the target might be only expressible by equations of still higher degree or by infinite series. The error in the individual measurements limit the accuracy with which the equations of this curve or the coordinates of the points along it may be determined even if the coordinates of the starting point or some other reference point along this curve were known with perfect accuracy.

The error involved in representing the path of the target by an equation whose degree is one less than the number of readings taken is no greater than the uncertainty of representing the path by an equation whose degree is equal to the number of measurements when the increments in the measurements is equal to the expected error of the measurement. Thus we have access to equations that are not dependent upon assumptions as to the nature of the path of the target. If the equations representing the path of the target are of degree greater than the number of readings taken in the manner defined the ability of the system to indicate the motion as defined by the higher terms of the equation is lost because of the expected accuracy of the system. In other words the system using a given measurement accuracy in determining the range increments has only a finite resolving capability thereby limiting the fineness with which the variations of the path may be determined. Taking readings closer together than as described may result in some marginal improvement.

Over the region of measurement the path of the target can generally be described by three equations showing the cartesian coordinates as functions of time.

$$x = x_o + \sum_{n=1}^{n=N-1} \alpha_n t^n$$

$$y = y_o + \sum_{n=1}^{n=N-1} \beta_n t^n$$

$$z = z_o + \sum_{n=1}^{n=N-1} \gamma_n t^n$$

Where:

$x_o, y_o, z_o$ are the coordinates of the position of the target at the time of the initiation of the measurement sequence.

$x, y, z$, are the cartesian coordinates of the point at time t after initiation of the measurement sequence.

$N$ is the number of readings taken in the sequence $\alpha_n, \beta_n, \gamma_n$ are unknown constants which appear as unknowns in the equations.

$n$ is an integer

The total number of unknowns introduced by these equations is three times the number of readings minus three, $3(N-1)$. The total number of equations thus made available is equal to three times the number of system readings, $3N$. The following equations may be written of the path of the target including the starting point are thereby determined. These equations are not based on any physical laws of motion other than the continuity of the path of the target. Extrapolation using the derived equations to times before and after the measurement sequence is hazardous. Such extrapolation is often desirable as in position prediction for intercept. Such prediction should be based on at least some knowledge of the forces governing the motion of the target. Examination of the equations of motion derived by the method described above may lead to the knowledge required for intelligent extrapolation. However, it must be remembered that the equations were derived to describe the path of the target within the interval of the measurement sequence, and particularly the positions occupied by the target at the epochs of the readings. Even interpolation between the points of readings should be based on understanding of the physical relationships of the motion of the target. Examination of the equations may also indicate the existence of unsuspected forces affecting the motion of the target which might not have become apparent had assumptions been made at the outset as to the nature of the motion of the target.

The assumptions that may be made relative to the motion of the target are manifold. If knowledge of the physics affecting the path of the target is such as to permit the assumption of equations of lower degree than that indicated by the above method the computing procedure might be simplified by reduction of the number of unknowns and consequently, the reduction of the number of equations and unknowns required. Elimination through special knowledge of any of the terms in the equations results in similar simplification. Relationships need not necessarily be expressed as a function of time. Confinement of the motion of the target to an unspecified plane provides a means of employing fewer readings than necessary in the general method.

TWO STATION NAVIGATION SYSTEM

In FIG. 5 there is shown an embodiment of my invention in which the position of the receiver located in the moving object 79 is determined in only two dimensions relative to a pair of fixed transmitters 82–83 which are a known distance apart thereby providing a means of navigation of the vehicle carrying the receiver. The system as shown is intended to operate at or near the surface of the earth. Under any circumstances the system may always be considered to operate in a plane since a plane is always determined by three points. The only three points basic to this system are the locations of the station 82, station 83 and the vehicle 79 being navigated. These stations consist simply of a standard frequency oscillators 84 and 85, respectively, and a simple continuous wave transmitters 82 and 83, respectively connected to suitable antennas 80 and 81, respectively.

$$M_{it} = \sqrt{\left(\sum_{n=1}^{n=N-1} \alpha_n t^n + x_o - a_i\right)^2 + \left(\sum_{n=1}^{n=N-1} \beta_n t^n + y_o - b_i\right)^2 + \left(\sum_{n=1}^{n=N-1} \gamma_n t^n + z_o - c_i\right)^2} - \sqrt{(x_o - a_i)^2 + (y_o - b_i)^2 + (z_o - c_i)^2}$$

where $M_{it}$ is the measurement taken by the $i$th station at time $t$. When N readings are taken by the system there results a set of 3N equations in 3N unknowns which may be solved for the unknowns. The equations There need be no modulation whatever employed by these transmitters. However, use of either transmitter for communications purposes simultaneously with use thereof for navigation purposes is perfectly possible.

The transmitter carrying the communication signal must of course be modulated with that signal. Such apparatus is not a part of the navigation system and is not shown in the diagram.

Transmitter identification can be provided either through modulation of the transmitted wave or through the frequency assignment of the individual transmitter. In the system described here the transmitters are identified by the frequency of their unmodulated waves.

FIG. 6 shows a typical vehicle path and the relationship between the path, the positions of the stations 82 and 83, which are designated $-a$ and $+a$, and the coordinate system. The coordinate system was chosen to simplify the mathematical expressions used to describe the geometrical relationships involved.

FIG. 7 shows the equipment carried in the aircraft or vehicle 79 by means of which the crew of the aircraft is able to determine the position of the vehicle. The aircraft carries both the equipment for making the necessary measurements and the equipment for computing and displaying the vehicle positional data. In the system described here the data is fed automatically and directly into the computer without the necessity of human intervention or manipulation.

The signals from both transmitters enter the receiving system aboard the aircraft through a single antenna 90 and are amplified in the broadly tuned input RF amplifier 91. The output of the amplifier 91 is fed into each of two similar channels only one of which is shown in detail. One of these channels is tuned to the frequency of one of the transmitters for example, transmitter 82 and the other channel is tuned to the frequency of the other transmitter, for example transmitter 83. At the input of each channel the signal is amplified in a narrow band TRF amplifier 93 and passes into a conventional mixer 95. The mixing signal is derived from frequency synthesizer 96 which is stabilized by standard frequency oscillator 97.

The frequency of the mixing signal is removed from that of the signal of the transmitter by a value known as the IF frequency. The IF signal output from the mixer 95 is amplified in IF amplifier 98 and fed into two synchronous detectors 99 and 100. The synchronizing signal for operation of these detectors is provided by the frequency synthesizer 96. This signal is at the IF frequency and is fed into the phase shifters 101 and 102. One of the phase shifters advances the phase by 45° and the other retards the phase of the signal by 45°. Thus the two synchronizing signals used to synchronize the synchronous detectors 99 and 100 are 90° out of phase with each other. The outputs of the synchronous detectors are passed through low pass filters 103 and 104 to limiting amplifiers 105 and 106 respectively. These limiting amplifiers may be of the variety commonly known as Schmidt flip-flops. The signals from the limiting amplifiers 105 and 106 are essentially square waves. The leading and trailing edges of each wave are very steep and the top of the wave is quite flat. The waves are differentiated by differentiators 107 and 108 and the negative peaks cutoff by diodes 109 and 110 respectively. The outputs of the limiting amplifiers 105 and 106 are employed to operate gates 111 and 112 respectively, each gate being controlled by a signal from the opposite subchannel so that the pulses from one gate indicate movement of the receiver toward the transmitter and the pulses from the other sub-channel indicate movement away from the transmitter. Each pulse indicates a movement of one wavelength. These pulses are fed into a reversible counter 113 which is typical of many on the market. The counter is controlled by signals from the timer 114. Included in the counter system is the circuitry for composing the entire data "word" including the timing information. The output from counter 113 is fed into the computer memory. Also fed into this same memory is the count word from the second channel. No time component is required in the signal from the other channel as there is already such a signal on the word from the first channel and the readout of the two channels is simultaneous. The computing memory contains the necessary shift registers 115 to provide isolation between the counters and the computer logic 116. The timing signal for the operation of these devices is also obtained from the timer 114. The count measurements are fed from the memory 115 to the computer 116 where the position of the aircraft is calculated and the results of the calculation are then shown on the display 117.

The calculation that must be performed by the computer 116 is the simultaneous solution of a set of equations. The set of equations is composed of equations of two types. One type of equation shall be called the "measurement equations" and the other type shall be called, for lack of a better name, "coordinate equations." The measurement equations are the familiar differences of ranges expressed in terms of the cartesian coordinates of the stations and the target. The measured quantities appear only in these equations. The coordinate equations are quite general, descriptive of any continuous motion whatever over the region of measurement. There is one measurement equation for each measurement performed by the system. The number of coordinate equations is equal to the number of coordinate axes of the system. Since this is a two dimensional system, there are only two such equations in the equation set to be solved. There is one coordinate equation for each coordinate axis. The measurement equation is the same for each point and is independent of the number of points. The coordinate equation is dependent upon the number of readings taken. The coordinate of each point is represented in the equation relating to a particular coordinate axis. The coefficients of the coordinate equation remain fixed for a given number of readings.

The complete set of simultaneous equations for the system operating with five readings is shown below:

$$\sqrt{(x_1+a)^2 + y_1^2} - \sqrt{(x_0+a)^2 + y_0^2} = M_{11}$$
$$\sqrt{(x_1-a)^2 + y_1^2} - \sqrt{(x_0-a)^2 + y_0^2} = M_{21}$$
$$\sqrt{(x_2+a)^2 + y_2^2} - \sqrt{(x_0+a)^2 + y_0^2} = M_{12}$$
$$\sqrt{(x_2-a)^2 + y_2^2} - \sqrt{(x_0-a)^2 + y_0^2} = M_{22}$$
$$\sqrt{(x_3+a)^2 + y_3^2} - \sqrt{(x_0+a)^2 + y_0^2} = M_{13}$$
$$\sqrt{(x_3-a)^2 + y_3^2} - \sqrt{(x_0-a)^2 + y_0^2} = M_{23}$$
$$\sqrt{(x_4+a) + y_4^2} - \sqrt{(x_0+a)^2 + y_0^2} = M_{14}$$
$$\sqrt{(x_4-a)^2 + y_4^2} - \sqrt{(x_0-a)^2 + y_0^2} = M_{24}$$
$$\sqrt{(x_5+a)^2 + y_5^2} - \sqrt{(x_0+a)^2 + y_0^2} = M_{15}$$
$$\sqrt{(x_5-a)^2 + y_5^2} - \sqrt{(x-a)^2 + y_0^2} = M_{25}$$
$$x_0 - 5x_1 + 10x_2 - 10x_3 + 5x_4 - x_5 = 0$$
$$y_0 - 5y_1 + 10y_2 - 10y_3 + 5y_4 - y_5 = 0$$

The first 10 equations are the measurement equations. The last two equations are the coordinate equations. The measurement equations are nonlinear therefore iterative techniques are required in the computer.

In the system as described so far the readings are taken at equal time intervals. The system may be modified to employ equal increments of the range to either of the stations or equal increments of some function of these range increments. In FIG. 8 is shown a modification of the two station navigation system in which the readings are taken automatically for equal increments of the faster varying range. The system is identical to that shown in FIG. 7 except that the shift signal for the shift register is derived from a pair of counters 120 and 121. Each of these counters is driven by a pulse derived from the counting circuits at the output of either of the diodes in each channel. The counters are preset so that the reset signal is actuated each time the count reaches a fixed value. The output signal of either counter resets both counters and also actuates the shift register 122. In this manner the time element is removed from the actual determination of position. A timing signal from the timer 125 is shown entering the shift register 122 to be included in the word being transmitted to the computer 123. This signal is introduced so that the display 124 will ultimately show the various positions associated with the proper time. Furthermore, it is possible to compensate for errors in the frequencies of the standard frequency oscillators by observation of the time at which each reading is taken.

The two station method may be employed to find the range and angle to the moving vehicle through ordinary triangulation. If the system is used only for two dimensional motion on a plane that includes the stations there will be an ambiguity of two in the determination of the position and course of the vehicle. This ambiguity is resolved through the use of other data available to the navigator such as readings taken on other systems, or rough data available through dead reckoning. If one other station is available to the system readings on this station may be employed to resolve the aforementioned ambiguity or to determine the position of the vehicle in three dimensions. To accomplish these operations the station must of course not be on the line joining the two original stations. It is not necessary to make the count on the three stations simultaneously. One of the stations may be used as a sort of pivot station. A series of readings is taken using the pivot station and one of the other stations, and this series of readings followed at once by a series of readings using the other station and the pivot station. The two series of readings are solved separately but the measurements are so taken that the last range to the pivot station in the first series is the first range to the pivot station in the second series. The effectiveness of this mode of operation is dependent upon rapid tuning of the "front end" to the second station at the termination of the first series of readings. If an additional channel is installed tuned to the added station and taking data simultaneously with the other two channels the system can operate in three dimensional mode of operation in both making the measurements and in performing the computation. Another modification of the method is to employ a pivot station as before but employ the data taken with one station to find a two dimensional solution and then employ the data taken with the other station and the pivot station to make a two dimensional calculation. Combining the results of the two calculations gives the postion in three dimensions at each of the reading points and the initial point.

TWO-LEGGED SYSTEM

In order to track targets at extreme range, it is possible to improve the sensitivity of a continuous wave system that is operating from energy reflected from the target by arranging the system so that the transmitting and receiving equipment are at substantially separated points geographically. This modification of my invention involves little additional theoretical consideration. The measurement equations in this modification contain two additional terms but no more unknowns than those of the simpler systems in which the energy travels along only one path, either going and coming along the same line connecting target and station, or merely travelling in one direction along such a line. The following is the form of the measurement equation for such a system:

$$\sqrt{(x_j-a_i)^2+(y_j-b_i)^2+(z_j-c_i)^2} - \sqrt{(x_o-a_i)^2+(y_o-b_i)^2+(z_o-c_i)^2} + \sqrt{(x_j-a_o)^2+(y_j-b_o)^2+(z_j-c_a)^2} - \sqrt{(x_o-a_o)^2+(y_o-b_o)^2+(z_o-c_o)^2} = M_{ij}$$

where $x_j\ y_j\ z_j$ are the coordinates of the position of the target at the instant of the $j$th reading, $x_o\ y_o\ z_o$ are the coordinates of the position of the target at the beginning of the measurement sequence. $a_i\ b_i\ c_i$ are the coordinates of the transmitting station. $a_o\ b_o\ c_o$ are the coordinates of the receiving station. $M_{ij}$ is the measurement performed relative to the $i$th transmitter.

MAPPING

In the selected embodiments of my invention cited specifically in this application positions of the stations or reference points have been known; and they appear as known constants in the sets of simultaneous equations that are solved simultaneously for the position or positions of one or more moving objects. In the examples cited the positions of these stations or reference points generally may be changing or fixed. When the positions of these stations or reference points are unknown but constant the relative position of each with respect to the others may be determined by the same type of observations or measurements described previously in this application and using the same types of equations. The coordinates of the positions of the stations or reference points are added to the list of unknowns. Generally the number of measurements and the number of equations must be increased in any given system to accommodate the additional unknowns. Of course, the position of the aircraft relative to the stations is also determined in the solution of the set of equations.

In one embodiment of my invention an aircraft flies an unknown and nonlinear path over a ground area within which a number of transmitters or transponders have been established by parachute or other means. Doppler measurements of the change of range between the aircraft and each of the transponders are made by apparatus aboard the aircraft as it moves over the area being mapped. The measurements are made simultaneously relative to a plurality of the said transmitters or transponders. The equipment indicated for the Two Station Navigation System (FIGS. 5, 6 and 7) may be employed directly in a mapping capacity through a small change in the measurement routines. and the computer. As a simple example of the mapping method the Two Station Navigation System may be arranged to determine the distance, $2a$, between the two stations shown in FIG. 6. It is only necessary to include the distance between the stations in the list of unknowns, and write an additional motion equation. It may be desired to take an additional reading.

Mapping may of course be accomplished using only measurement equations if there are enough ground stations, reflectors, or other reference points. Three reference points are enough for planar mapping in two dimensions and four reference points are sufficient for three dimensional mapping without motion or path equations and using only the measurement equations. In three dimensions, using six stations, five sets of simultaneous measurements are required to obtain the relative positions of station and vehicle. With nine ground points only four simultaneous sets of measurements are required for simultaneous determination of the resultant 36 unknown relative station and vehicle positions.

The employment of motion equations relative to the moving target objects or relative to moving reference points or relative to both makes possible the reduction of the number of measurements required.

The reference points of the system may be receiving stations receiving signals from moving transmitters or they may be natural reflectors, or artificial reflectors, or they may be cooperating or unintentional transmitters. The reference points may be moving or stationary or moving depending upon the arrangement of the system and the equations employed. The number of variations of mapping systems employing my invention is unlimited and extends from systems in which all of the target objects and reference points are moving to systems in which there is only one moving object and all reference points are stationary.

In one application of my invention aerial photographs are calibrated by disposing across the terrain being mapped a number of doppler beacons as described above each doppler beacon being accompanied by a light or optical beacon capable of being seen on the aerial photograph. The distances between the beacons is then determined through the doppler system aboard the aircraft using the radio beacons, and this information employed to calibrate the map.

Another system for the detection of space missiles and the plotting of their positions employs the methods of my invention to accurately determine the positions of the stations of the system which may be moving or stationary and widely scattered while tracking the space objects.

In mapping systems dependent upon the stability or accuracy of local standard oscillators located at separated points around the system, the errors resultant from misalignment of the frequencies of the separated oscillators may be detected, determined, or accommodated by their inclusion as unknowns in the sets of simultaneous equations which describe the system. These frequency misalignment unknowns are incorporated directly in the measurement equations. It is generally necessary to increase the number of measurements in some manner to accommodate the additional unknowns. The identification of the transmitter through calculation of its frequency is also made possible by this method. Such identification would be valuable in situations where it is desired to assign the frequencies of the various transmitters very close to each other.

Mapping also provides a method of identification of the transmitters of a multiple transmitter system used for the detection and tracking of reflective moving objects. Thus all of the transmitters may be assigned to the same frequency using highly accurate frequency standards. The several echoes at the receiver owing to the various transmitters are then separated by their doppler frequencies and the positions of the transmitters determined through the process of calculation. Since the position of the transmitters are known identification is complete. Each receiver in the system contributes a group of these equations to the computation. The coordinate equations or the equations of motion, whichever are used, are derived in the same manner as described previously.

In FIG. 9 there is shown a two-legged system consisting of three transmitters 127, 128 and 129 at fixed and known positions on the ground. The relfected radiations from all of the transmitters are received, detected, and measured at a single receiving station 130. The electrical system is exactly the same as that employed in the navigational system previously described except that there are now three transmitters instead of two, and three channels in the receiving equipment instead of two.

Displacement Finder Employing Pulses

In FIG. 10 is shown a system employing the doppler principle and pulsed means for observation of the doppler phenomenon to determine the position and path of a reflecting object travelling in earth orbit above the atmosphere. The system is composed of two stations, a transmitter 131 located at one point on the earth, and a receiver 132 located at another point on the earth. At these stations are located accurate frequency standard oscillators 133 and 134, respectively, operating at a frequency that is nominally the same for the two stations. The transmitter 131 transmits narrow pulses of energy which are relfected by the moving object, and the reflected energy pulse is detected at the receiver 132. The standard frequency oscillator 133 at the transmitter is employed to maintain the interval between the transmitted pulses at an exact and constant value. The standard frequency oscillator 134 at the receiver is employed to determine the time interval between arriving relfected pulses. The difference between the standard interval between the transmitted pulses and the measured interval between the received pulses is a direct measure of the doppler effect. When this time difference is multiplied by the velocity of the propogation of the wave energy pulses, the product is closely equal to the change of the length of the propogation path during the interval.

The output of standard frequency oscillator 133 in the transmitter is fed into a frequency divider 135. The output of the frequency divider 135 is fed into a pulse forming unit 136 which forms one narrow pulse at exactly one point of the input wave from the frequency divider. This pulse is used to trigger the transmitter 130 which generates and transmits a powerful narrow pulse of wave energy at the instant it receives the triggering pulse from the pulse forming unit 136. The pulses of wave energy reflected from the moving object are received and detected at the receiver station 132 by the receiver unit and the output of this unit is a simple narrow electrical signal pulse that is employed to actuate the readout 137. Readout 137 is fed signals from the counter 138 which in turn is driven by the standard frequency oscillator 134. The readout 137 also receives a time signal generated by the timer 139 which signal is used by the readout 137 to generate the time digits of the reading. The complete reading word is then fed into the buffer of the computer over line 140.

This same equipment may be employed with similar equipments to obtain doppler data adequate for use in other systems with more than two stations shown in this application as employing continuous wave means.

Methods for computing the position and path of the motion of the moving object using data derived from a single transmitter and a single receiver are described in this application.

Displacement Finder Using Modulated Waves

In the art of measuring changes of distance there often occurs the need for operation in and near the point where the reversal of rate of change occurs over substantial or even extended periods of time. Circuits that are dependent upon the stability of slowly varying essentially continuous currents for such operation are generally relatively complicated or are limited in performance. See H. W. Kohler, U.S. Pat. No. 2,911,641. It is a general practice in the measurement art to employ a carrier wave of alternating current upon which the slowly varying signal is imposed by modulation, transmitted, and then retrieved by demodulation. Such a process is employed in a preferred modification of my invention in which it is desired to measure the change in range from a moving vehicle bearing a transmitter to each of three receiving stations.

A block diagram of the system is shown in FIG. 11. The vehicle equipment is shown at the top of the page and consists simply of a standard frequency oscillator 141, a modulator 142, a radio frequency amplifier 143, and an antenna 144. The nature of the modulation signal is not important. A simple sinewave may be employed for the purpose or the communications or telemetering signals may be employed. In the system shown all of the components of the modulation must be retained including the carrier. In a similar system, where additional equipment is employed in the receiving equipment, a balanced modulator may be employed and the carrier suppressed in the transmitted signal.

The receiving circuit contains a typical superheterodyne arrangement consisting of antenna 145, radio frequency amplifier 146, mixer 147, and intermediate frequency amplifier 148. The injection signal for the mixer 147 is obtained from the standard frequency oscillator 149 through frequency multiplier 150.

"Second detection" takes place in each of three separate channels. Two of the channels provide two out-of-phase signals necessary for rotation and for indicating the direction of change of phase. Use of the third channel is occasioned only by the introduction of the carrier technique to the measurement process and is employed to provide a polarity reference for the modulation signal. The signal from intermediate frequency amplifier 148 is fed into the two synchronous detectors 151 and 152. Injection signals for the synchronous detectors 151 and 152 are obtained from the standard frequency oscillator 149 through the phase shifters 153 and 154 respectively. Phase shifter 153 provides a minus 45° shift, and phase shifter 154 provides a positive phase shift of 45°.

The outputs of the two synchronous detectors 151 and 152 contain the modulation signal introduced by modulator 142 in the vehicle transmitter. The two signals are the same except for amplitude and polarity. The change in the amplitude and polarity of these signals relative to each other provides the indication of the change of phase between the center frequency signal of the signal arriving at antenna 145 and the signal from the standard local oscillator 149. The signals from synchronous detectors 151 and 152 are amplified in amplifiers 155 and 156 respectively. These amplifiers are tuned to pass the modulation frequencies. The signal from the intermediate frequency amplifier 148 is also fed into nonlinear detector 157 the output of which is amplified by amplifier 158 which is identical to amplifiers 155 and 156. The outputs of the three amplifiers 155, 156, and 158 may then be employed to drive a "selsyn" indicator the motion of whose rotor indicates the desired information as to the change in distance between the antennas 144 and 145. It would be possible to operate most Selsyn indicators by merely using the outputs of amplifiers 155 and 156. However the driving of the windings on the rotor by the signal from the third channel provides greater torque on the rotor and avoids a possible phase reversal in the motor. A non-circular rotor such as a straight laminated bar type must be provided if the third channel is not to be employed. The Selsyn may be employed to drive an odometer or other indicator. The output of the three amplifiers 158, 155 and 156 may also be employed in an electronic circuit which provides a two phase direct current signal similar to the outputs of circuits not employing the carrier method of stabilization, (see FIG. 3). The signals from the amplifiers 155 and 156 are fed into synchronous detectors 159 and 160 respectively. The synchronous detectors 159 and 160 also receive a synchronizing signal from amplifier 158. The outputs of the synchronous detectors 159 and 160 are fed into low pass filters 161 and 162 respectively. The outputs of the filters 161 and 162 may be employed on the stator windings of a synchronous motor as shown in FIG. 3 or they may be employed to drive an electronic reversible counter in the manner shown in FIG. 4 or in the manner shown by H.W. Kohler, U.S. Pat. No. 2,911,641.

A timing signal is derived by timer 163 using oscillator 149 as a source of standard frequency. Duration of the measurement is closely controlled by timer 163. Initiation of the measurement is accomplished by a "start" signal sent to each receiving apparatus simultaneously with the start signal sent to the other receiving equipments. Switches 164 and 165 are activated by the timer to control time of initiation and duration of measurement.

Many variations are possible upon this carrier principle. The modulation may be introduced at the receiver rather than at the transmitter. The received signal would be tracked by a "tracking filter" or phase locked oscillator. The output of the tracking circuit could then be modulated and then fed into two synchronous detectors placed and operated similarly to synchronous detectors 151 and 152. The other two channels would operate in much the same manner. It would not be necessary to employ a third channel as the modulation signal is already available in the receiving apparatus. The transmitter need then transmit only a continous wave. Also in a two legged system the illuminating transmitter could be modulated. The modulated signal would then be reflected by the moving target. The carrier polarizing signal could be derived as indicated in FIG. 11 or could be obtained by land line from the transmitter. Sideband tracking as shown by Costas in Proceedings of IRE, November 1958, could also be employed to obtain the carrier polarizing signal.

This method of measuring displacement may also be employed in systems wherein it is desired to place the receiving equipment aboard the moving vehicle whereby the vehicle may be navigated by taking measurements relative to a number of the transmitters shown at the top of FIG. 11. Frequency separation of the radio frequency carriers would be required and multiple receiving channels would be required in the vehicle, if the circuit were to be employed as shown. Frequency tracking on the sidebands as shown by Costas would make possible the use of a common radio frequency by all transmitters. The modulation signal could then serve to identify the particular transmitter. The method may be employed in general in any of the systems described in this application where measurements of change of distance are required.

TIMING AND FREQUENCY CONTROL

Timing is an important part of my invention. In those embodiments of my invention where an actual measurement or count is performed at points that are widely separated in space the difficulties of obtaining simultaneous initiation and termination of the measurements are not negligible. Generally the uniformity between receivers of the duration of the measurement is more critical than the simultaneity of initiation of the measurement. Where a local frequency standard is employed as a reference for measurements of the received signal this same frequency standard may be employed to control the duration of the measurement. Time of initiation of the measurement may be obtained by a common signal transmitted to all stations or by a prearrangement. In the event that communications are sufficiently stable and accurate between receivers a common frequency standard may be transmitted to all receiving equipments, and similarly a common timing or "on-off" control of the duration of the measurement may be transmitted to all receiving equipments. Such a condition exists in those embodiments of my invention where there is only one receiving station or receiving vehicle operating in conjunction with several transmitters. The transmitters may require accurate frequency standards, or if communications are adequate they may be frequency controlled by a source common with the receiver.

Measurement Sequence and Significant Epochs

When a position determination is made on the basis of derivatives there is only set of space coordinates involved and only one epoch. An epoch is here defined as an interval of time that is so short that it is without significance in the physical and mathematical considerations in the method under consideration. When position is determined on the basis of the measurements of a number of contiguous or overlapping measurements of the change of a geometrical quantity there is a plurality of successive space positions involved and a corresponding plurality of particular epochs associated with these measurements. A sequence of measurements of change of a geometrical quantity, called in this application a "measurement sequence" is continuous from its start to its finish. The infinitesimal instants of time at which a measurement is started and finished are called epochs of initiation and termination of the measurement, and these are "significant epochs" of the measurement sequence. The corresponding points or positions in space where the moving object happens to be when a measurement is started and finished are points or positions of initiation and termination of the measurement; and these are significant points or positions of the measurement sequence. The interval of time between the two epochs of a measurement is the measurement interval.

The words measurement sequence refers to the acquiring by direct measurement of the complete set of data necessary for a complete determination of some geometric quantity that is not directly measured.

The measurement sequence for a given single geometric quantity is the performance of several measurements of the change of that quantity with respect to time, and which measurements are continuous in some manner with respect to each other. The measurements may be performed contiguously in that as one measurement is terminated the next is initiated within the same epoch. Alternatively all of the measurements may be started simultaneously at the same "epoch of initiation" and terminated successively at a plurality of succeeding separate epochs. Other orders of taking the data may also be employed. The later described procedure is preferred in this application. This procedure places a minimum requirement on the electronic counting and "readout" equipment employed in many of the embodiments of my invention and the form of the resulting data is easy to process. In taking this data the measuring equipment, which may be a counter or a timer is turned on at the epoch of initiation or alternatively it may simply be read at this epoch or point. At successive epochs the values are "read", "read out", or "taken" without interrupting the process of the continuous timing or counting process that constitutes the measurements corresponding to succeeding readings. When the measurement sequence includes the measurement of the changes of several simultaneous geometric quantities relative to a single moving object, the several separate series of measurements are performed simultaneously employing the same significant epochs, or simply epochs, and the same significant points or significant positions.

Algebraic Sum

Various embodiments of my invention differ from each other simply by whether a plus or a minus sign appears in certain binomials in the measurement equations. All the basic principles of the invention remain the same for that group of systems where this sign is positive for all such terms, for that group of systems where this sign is negative for all such binomials, and for that group of systems where combinations of binomials containing either sign are employed. All of these groups include: (1) reflective systems in which waves are emitted by a transmitter or transmitters of the system, relfected or transponded by the target object and intercepted by a receiver or receivers of the system, (2) one way systems in which waves are omitted from a transmitter or transmitters and received and detected at a moving vehicle and (3) one way systems in which waves are transmitted from a moving vehicle and intercepted by one or more receivers of the system.

A typical measurement equation illustrating this relationship is:

$$M_{ikj} = (r_{ij} \pm r_{kj}) - (r_{io} \pm r_{ko})$$

Where $M_{ikj}$ is the measured quantity $r$ indicates the absolute value of straight line distance subscript $o$ indicates the position of the moving object at the initiation of the measurement sequence subscript $j$ indicates the position of the moving object at the termination of the $j$th measurement subscript $k$ indicates the $k$th station or reference point of the system subscript $i$ indicates the $i$th station or reference point of the system The term "algebraic sum" is employed to mean that either sign may be taken in either of the terms without regard to the sign taken in any other term as required to express the relationships existing in the measurement technique.

The variety of techniques for performing the measurements of changes of sums or differences of distances is manifold and well known in the art. It is unnecessary to remind one skilled in the art that mixers may be employed for taking the sums of the frequencies of two signals as well as the differences. To confine this application to reasonable length detailed descriptions of embodiments of my invention in which summation of two signals is achieved in a mixer or by other means are not included; and such systems are only further embodiments of my invention as are systems employing various combinations of measured sums and differences, that is, combinations of plus or minus signs in the various binomials.

Reference on Measurements

H. W. Kohler in U.S. Pat. No. 2,911,641 issued Nov. 3, 1959, shows a one-legged system for measuring radial displacement from the station of a moving reflective target. This arrangement could serve as a part of the measuring instrumentation for some embodiments of my invention. Attention is called in particular to the circuitry for converting the two phase signal, which is capable of indicating magnitude sense of displacement, to a digital indication of magnitude retaining the sense indication. Kohler does not show a method of control of the duration of the measurement.

H. P. Kalmus in Proc. of the IRE Vol. 43, No. 6 June 1955, pp. 698–700 shows a method of obtaining the two phase signal indicating the sense and magnitude of change of distance. This technique could be applied in some of the embodiments of my invention.

Position Determination without Motion Constraints

It has been shown in a previous application, Ser. No. 86,770, that given a sufficient number of operating sites it is possible to determine uniquely the position of a moving object at the initiation and at the termination of any substantial movement by observing or measuring only changes of distances. It is not necessary to measure or to know a priori any distance related to the moving object. In the analysis associated with those techniques the equations expressed exactly the relationship between the coordinates of the various positions occupied by the moving object at the initiation and termination of the several measurements, the measurement values, and other parameters of the system. The recommended methods of solving the equations in some instances were approximate, but the equations themselves are expressions of exact relationships relative to the geometrical model of the actual physical system. One geometric model in this technique is a static structure of straight lines drawn between the various station points of the system and two or more unrelated points in space occupied or previously occupied by the moving vehicle. The vehicle positions can be any points in space. No relationship is assumed or established between those points in the geometric model other than that relationship established through the measurement of distance changes. Equations relating the measured values of distance changes to position coordinates of the moving objects and the coordinates of the system stations are called measurement equations in this application. These measurement equations are all that is required to describe the geometric model employed in the methods previously described.

The only assumptions made concerning the motion of the vehicle in establishing the geometric model in the previous methods were that the moving object could not be in more than one place at a time and that the moving object did not visit the same position twice in any measurement sequence employed for a position determination. Discontinuity of the path of the moving object in either time or space is acceptable everywhere except at the positions of the object at which readings are made of the measured quantities. The values of the readings of the measured quantities are directly related to the coordinates of the positions of the moving object at the times and places when the readings are made, and the times and places where measurements are initiated with absolutely no relationship to the path traversed by the object in getting from one place of reading to another or the manner of traversing that path.

Motion Constraints

In the improved methods of position determination presented in this application the constraint of continuity of the path of the moving object in space is imposed. The constraint of continuity of motion with time is also sometimes imposed in the methods described in this application. With only the additional constraint of continuity in the analytical treatment of the problem there is no greater physical constraint assumed on the actual motion of the target object than before this constraint is added. Practical mechanics of the motion of any object in space as we know it precludes the moving object being in two places at the same time and assures us of the continuity of the path. It is not necessary to express this fact in the mathematical procedures for determining position from measured doppler data, as has been shown in the previous application. Expressing this constraint analytically and including it in the mathematical procedures of position determination in no way restricts the generality of the resulting methods insofar as these methods are applied to physically realizeable moving objects. Analytical recognition and use of this unavoidable physical fact of life makes possible the improved methods that form one of the categories of this disclosure.

The assumption or discovery of the a priori knowledge of further constraints on the motion or path of the moving object makes possible still other improved methods which form another category of this disclosure. These further constraints substantially restrict the motion that can be accommodated by the mathematical procedures that are set up according to the particular constraint. Simplification of data taking and handling and computation procedures are some of the advantages of methods employing these somewhat specialized constraints. One such constraint is that the object moves in a straight line. Another constraint may be an elliptical or parabolic path. Whereas the more general constraints may be used in a rather routine fashion, use of specialized constraints makes advisable precautions to ascertain that the motion of the moving object is indeed within the assumed constraints expressed analytically, at least to a satisfactory degree of approximation.

In this application equations descriptive of the motion are added to the measurement equations to provide improved methods of position and motion determination. These additional equations are called "motion equations". The motion equations relate the coordinates or the ranges of the reading positions to each other and represent relationships that are independent of the measurement relationships.

Measurement Equations

The following applies to systems wherein the fundamental measurement is of a finite change of distance rather than the measurement of an infinitessimal change of distance or rate of change of distance.

The measurement equations, so called because the values of the measured changes of distance appear therein, may be written as follows:

$$M_{kij} = (r_{ij} \pm r_{kj}) - (r_{io} \pm r_{ko}) + \sum_n e_n$$

The $r$'s are functions of the unknown coordinates of the moving object and the coordinates of the stations of the system and represent the distance between the position of the moving object and the system station indicated by the subscripts. The $e$'s are the unknown errors in measurement owing to misalignment of local standard frequencies of the pair of stations involved in the particular measurement. The $M$'s are the values of the measurements performed at the times and stations indicated by the subscripts. The subscript $j$ denotes the point in space occupied by the moving object at the time the measurement is completed and also the instant or epoch of time at which the measurement is completed. The same quantities are indicated for the initiation of a measurement by this subscript being zero. Conventionally all changes of distance are referred to the position occupied by the moving object at the initiation of the measurement sequence, the readings of which are to be used to establish a set of simultaneous equations. The $i$ and $k$ subscripts indicate the two stations involved in the measurement. The choice of plus or minus signs depends upon the manner of making the measurement, and the choice must be the same for both binomials. If the measurement system consists simply of a transmitter station and a receiver station and a reflecting target, the positive sign is employed as the measurement is one of the change of the sum of the range to the transmitter and the range to the receiver from the moving object. The negative sign is employed when the $r$'s refer to two stations of the same kind, either transmitters or receivers. In this instance a third station, of the opposite kind, is employed in making the measurement but the range to it does not appear in the measurement equations. Its operation has no effect on the mathematical operations.

The two stations relative to which the measurement equation is written is called a "station pair" in this application. Measurement equations for systems involving transmission either to or from the moving object but not in both directions are obtained by suppressing the appropriate $r$'s in the equation. Measurement equations for systems in which transmission and reception is performed at the same stations are simply:

$$M_{ij} = r_{ij} - r_{io}$$

There are no error terms since the received signal is compared with the local standard controlling the transmitted signal.

In these measurement equations the $r$'s may be expressed in terms of the cartesian coordinates of the moving target and the cartesian coordinates of the stations cooperating in making the measurement. The coordinates of the station as well as the coordinates of the moving object may vary from measurement point to measurement point. When measurements can be taken simultaneously by an adequate combination of stations a complete set of equations for the determination of the positions of the moving object can be derived using only the measurement equations. It is also possible to determine the coordinates of the cooperating stations using only these measurement equations.

Motion Equations

No matter how many readings are taken by any system whose number of station measurement combinations, or station pairs, equals the number of coordinates axes of the space or area in which the target is moving there are never enough relationships or equations developed solely by the measurements to permit the determination of the positions of the target corresponding to the various measurements. For example, a system employing three station pairs is capable of making three simultaneous measurements on a given target. If the target is moving in three dimensional space each new reading by the system provides three new elements of data and three more unknowns. Each new three equations resulting from a reading is accompanied by three new unknown coordinates of the new position of the moving object. When the position occupied by the moving object at the initiation of the measurement is included there are always three more unknowns than there are measurements taken and consequently the number of measurement equations is always three less than the number required for a complete set permitting a simultaneous solution. To obtain a complete set of equations it is necessary to introduce additional relationships of some kind. Such additional equations may be obtained through the use of one or more additional station pairs. These methods are the subject of the previous patent application. Other methods involve the generation of equations based on the known physical mechanics of the path or motion of the object. These motion equations may represent the path of the moving object, the type of path of the object, or some constraint or limitation on the motion or path of the moving object. Equations relating to displacements along the coordinate axes would constitute motion equations, and the coefficients may be known or it may be that they be determined as part of the problem. The equation of a plane to which the motion is confined would be a motion equation. Equations relating successive displacements along a coordinate axis would also constitute motion equations.

Interrupted Tracking Sequence

The possibility that there may be a signal interruption or that one or more readings may be missed is generally present in practical displacement type doppler systems. If continuous waves are employed for the purposes of making the primary measurements the signal level may fall below that required for accurate phase tracking or for maintaining "phase lock". If pulses are employed there is the possibility that a sudden burst of noise will mask the signal just at the time of the arrival of the pulse at the receiving element of the system. An intermittent or unexpected temporary failure of the transmitter to issue an expected pulse could also cause an interruption of the measurement sequence or the deletion of one or more of the readings of the sequence. Failure of a readout mechanism might be a cause for dropping a reading in a continuous wave system.

There are two major cases of interruption of the measurement sequence. In one type of interruption there is simply the skipping of one or more readings. The fundamental timing is not interrupted, skipping of pulse or readout failure would be of this type. The second and perhaps more serious type of failure is such that the measurement sequence or a part of it is effectively terminated and must be reinitiated after the interruption. Loss of phase lock in a continuous wave system or breakdown of a station's frequency standard would be samples of such interruption. In this class of interruption any measurement started before the interruption does not extend through the interruption. In the less serious type of interruption measurements started before the interruption carry on through the interruption but measurements scheduled to be completed during the interval of the interruption are missed.

Any equation linking points on the path of the object before the interruption to points on the path after the interruption serve to link that part of the measurement sequence completed before the interruption to that part of the sequence completed subsequent to the interruption. Equations that result from measurements which extend through the interruption serve this purpose; intervals are initiated prior to the interruption and terminated subsequently to the interruption. Motion equations of the various types described in this application are of general use for this purpose. In some instances, it is desirable to modify the motion equations used in a particular method to eliminate terms that are associated with points occurring in the interruption interval or to add points and measurements so that sufficient data is present to obtain a position determination.

Method Dependent on General Motion Relationships

The only assumptions that are valid for all motions of an object are that the path is continuous, through the space traversed by the object while the measurements are being taken and that the object cannot be in more than one place at a time. These two assumptions are quite practical and include all conceivable domains and modes of operation. Theoretically, it can also be assumed with equal certitude and generality that the path or position of the vehicle is continuous with time. During the course of the measurement sequence the moving object is at some position along its path at all times. However, in order to employ time as a parameter in position determination, it is sometimes necessary or at least desirable to place some further restriction on the motion of the object relative to time. These restrictions, so general in character that they are not treated in this application as special constraints, are that the motion is always in one direction along the path and that the motion is continuous. The moving object does not reverse itself and retrace its former path. Sometimes the restriction that the object does not stop during the measurement sequence is imposed. In practice it is possible to accommodate operation of the moving object in which the object comes to rest for a period of time by stopping the clock during the period that the object is at rest. Since the system is sensitive to any change of position, the operation of stopping the clock is simple, particularly with a continuous wave system. To the above assumptions, arbitrarily and for convenience, is added the assumption that the object does not occupy the same position twice during a measurement sequence. The validity of this assumption is also easily checked from the measurements, particularly with continuous wave systems. Should it be desired to operate with motion that includes stopping, retracing and crossovers, more elaborate methods may be employed including step by step processes.

One purpose of my invention is the determination of the position of the moving object during the measurement sequence. It is not essential as an operational procedure nor is it always an essential objective to determine or generate equations or numbers indicating the position of the moving object at other points either preceding or succeeding the measurement sequence. The motion equations indicated in this section of this application and concerning systems operating without special constraints on the motion are not chosen to fit any particular set of physical circumstances affecting the path of the moving object. The applicability of these equations and techniques is independent of the validity or nature of other equations that can be used to describe the motion. These general motion equations may or may not be usable for prediction. They may be used for deriving position data usable by other methods for position prediction and orbit determination.

The methods described in this application are but a limited example of the many possible methods that may be employed to determine the position of a moving object by measuring changes of distances. The general method may be altered in the number of readings taken, the number of stations employed, the mathematical expressions or equations used to describe the system and the motion of the object, and the mathematical procedures employed to gain a solution of these equations.

The method of determining the position of the moving object is initiated by expressing the continuous path or motion of the object in terms of one or more infinite series. Simple geometrical series in terms of some parameter such as time may be employed. Fourier series may also be employed or series of other harmonic functions. Equations consisting of only a finite number of terms of these series are derived by dropping the terms of degree or order higher than a certain limit. The determination of this limit on the number of terms employed will be described. The resultant one or more polynomials form the motion equations and are employed with the measurement equations to form a finite solvable set of simultaneous equations. The number of unknown elements involved in the derived motion equations in great measure determines the number of readings or measurements required of the system for a complete determination of position. Should the number of readings or measurements be otherwise limited the number of terms of the series that may be employed would be correspondingly limited.

The accuracy of this type of system is not simply the accuracy of the measurements of changes of distances but is a somewhat complicated function of the measurements, the geometrical relationship between the stations and the moving object, and the accuracy with which the motion equations describe the characteristics of the path of the moving body. There is at least one finite source of error associated with each of these elements of the method. Furthermore these elements are not necessarily independent of each other in their effects on the accuracy of the system. The greatest uncertainty in determining the accuracy of the method is in determining the adequacy of the motion equations employed in the set of simultaneous equations to be solved. Since no special constraints are assumed on the motion of the object in this category there is a degree of uncertainty regarding the adequacy of any equation containing a limited number of terms to fully describe the path or even the relationship between separate points along the path. Fortunately there are methods of statistically checking the adequacy of the derived motion equations. For any particular set of motion equations and measurement error it is a simple matter to determine the system infinitessimal error by writing and inverting the error matrix, then multiplying by the measurement error vector.

Method Using Time as the Series Argument

Time is an easily measured and recorded parameter. Measurements of elapsed time may be performed and recorded simultaneously with the measurements of changes of distance. Time has another convenient characteristic in being single valued, for any value of time there can be only one set of coordinates of the moving object. Time as a parameter is also of value in having easily recognized physical significance. A simple geometric series in time forms an excellent motion equation for many purposes. Each of the orthogonal coordinates is expressed as a geometrical series of time. The power of the highest term in the series employed is determined by any or all of several factors: the required accuracy, the accuracy of the measurements, the geometry of the system, the capacity of the computer, and the number of readings taken. These factors can be interdependent. Any knowledge as to the forces acting on the moving object would constitute a special constraint and will be discussed under a separate heading. It is then necessary to determine by other means the degree of the motion equation to be employed in the simultaneous set. It is quite possible that only the infinite series could theoretically express the motion of the object perfectly. However, a practical value of the degree of the motion equations is a value which permits position determination with satisfactory confidence and accuracy. Furthermore, it is useless to attempt to utilize a set of motion equations of degree higher than that warranted by the accuracy of the measurements.

The coefficients of the time series are not generally known and they are determined as part of the solution simultaneously with the determination of the coordinates of the various points along the path significant in the method.

Measured Values as Argument in the Motion Equation

The values of the measured changes in ranges, or changes of the sums or differences of ranges constituting the fundamental measurement of the systems may be employed as the argument in a series forming a motion equation. Furthermore some function of one or more of these values may be employed as the argument. An advantage of using the measured values as the argument lies in independence of the time factor. The mathematical operation is then completely independent of the variations in the speed with which the moving object proceeds along its path. When using time as the argument of the series, there is the problem of accommodating periods when there is no motion of the object. It is possible to write time series of higher degree to accommodate these periods, but the computing process may be lengthened and the required capacity of the computer increased. In the same manner as when time is employed as the argument the system readings may be taken at integral values of the argument though this restriction is not theoretically necessary. A possible function of the measured quantities that may be employed as the argument is the square root of the sum of the squares of the measured quantities of the various stations. In general, it is a good practice to relate in some systematic manner the incidence of the system readings to the argument.

A motion equation using the measured quantities as the argument may be written for each coordinate axis of the system and for each of the measured quantities. Thus a three station system with change of range as the measured quantity can develop nine series equations in three dimensional operation. These equations may be employed as substitutes for measurement equations in the sets of simultaneous equations to be solved or may be employed to obtain redundancy for improved accuracy or for resolution of target ambiguity. In general, it is only necessary to employ the values of a single measurement mechanism in conjunction with the measurement equations to obtain a complete and solvable set of equations.

The "Coordinate Equations"

The term Coordinate Equations is given in this application to equations that are derived in terms of a single space coordinate from any of the power series parametric equations in that particular coordinate. These equations are motion equations in that they relate the various positions of a moving object to each other. Use of these equations results in a simpler set of equations to be solved simultaneously. In some instances the coefficients of the coordinate equations may be precomputed without reference to measurements and therefore their values are a part of the fixed computer program, rather than items to be determined as a part of the computation procedure. The equations are homogenous in the first degree. Use of these equations in some cases eliminates the necessity for determining the values of the coefficients in the parametric power series; and, in fact, the power series need not be employed at all in some instances.

There is a separate power series for each coordinate axis. The same argument may be employed for all three, as when time is used as the argument. If desired, different arguments may be employed for the series equation corresponding to each coordinate axis. The degree of the highest term is generally one less than the number of system readings taken. For each increment of the argument there is a corresponding set of measurements constituting a system reading. The values of the increments of the arguments are known; and from the series equations for a given coordinate axis evaluated for each point associated with each of the readings and the starting point or other reference point one obtains, by eliminating the coefficients of the series, a single equation representing the relationship between the values of that particular coordinate at the various points of measurement.

The following is an example of the derivation of the coordinate equation of the X coordinate axis of a three reading system. Time $t$ from the initiation of the measurement sequence is employed as the argument. The value of the X coordinate is expressed for three points along the path of the object in terms of the time $t$ at which it is at each of the points:

$x_1 = x_0 + \alpha_1 t_1 + \alpha_2 t_1^2$
$x_2 = x_0 + \alpha_1 t_2 + \alpha_2 t_2^2$
$x_3 = x_0 + \alpha_1 t_3 + \alpha_3 t_3^2$ For uniform increments of time one may obtain from these the following:

$t_1 = 1 \quad t_2 = 2 \quad t_3 = 3$
$x_0 - 3x_1 + 3x_2 - x_3 = 0$

These equations may be obtained for each coordinate axis of the system. They are called coordinate equations because only a single coordinate axis supplies the variables of one equation. These linear equations provide the information needed to make a complete and solvable set of equations when used with the associated measurement equations.

Motion Equations in Terms of Two or Three Coordinates

Equations in this category are derived directly from the assumption of continuity of the path of the moving object and the assumption that the object cannot be in two places at the same time. A third assumption will be added for the purposes of simplifying the explanation of the process. The equations are simple power series of one coordinate in terms of another coordinate. For motion in three dimensions equations of the following form may be written using the infinite series:

$x = x_0 + a_1 z + a_2 z^2 + a_3 z^3 + a_4 z^4 + \ldots$
$y = y_0 + b_1 z + b_2 z^2 + b_3 z^3 + b_4 z^4 + \ldots$ The number of terms employed in the assumed motion equation may be determined in the same manner as outlined for previous motion or path equations written in terms of some other parameter.

In using the equations as shown the assumption that the object moves in one direction only along the axis of the independent variable coordinate during the measurement interval is made. Any total path can be broken into smaller segments for which this assumption would be valid.

A set of these equations may be written for each position of the moving object corresponding to a system reading and corresponding to the initiation of a sequence of measurements. As before the degree of the highest term in the series may be one less than the number of readings taken by the system in a given sequence. One may eliminate the coefficients of the coordinate terms by simultaneous solution of this number of equations deriving from the solution a single equation in terms of the two coordinates involving the other unknowns. This technique would be the equivalent of that described above for the derivation of coordinate equations. However, since the coordinates are unknown this operation would have to be handled algebraically, and it would probably be easier to employ the power series equations directly in forming the set of equations to be solved simultaneously with the measurement equations.

Other Power Series

Power series for each of the coordinates of the moving object may be written in terms of a wide variety of functions of these coordinates. Typical of such functions are:

$l = \sqrt{x^2+y^2+z^2}$
$l = \sqrt{(x_f-x_o)^2 + (y_f-y_o)^2 + (z_f-z_o)^2}$

Either of these equations may be used with the power series:

$x = x_o + a_1 l + a_2 l^2 + a_3 l^3 + \ldots$
$y = y_o + b_1 l + b_2 l^2 + b_3 l^3 + \ldots$
$z = z_o + c_1 l + c_2 l^2 + c_3 l^3 + \ldots$ The argument must not reverse itself in the measurement sequence. The equation defining the argument, the series equation, and the measurement equation appropriate to the particular system form a set of simultaneous equations which are solved simultaneously for the required unknowns. These functions constituting the argument in these series are easily interpreted physically. Other functions of the coordinates not so easily interpreted or perhaps without understandable physical significance may be employed as the argument of the power series. The distance from any other point may also be employed as the argument of the power series. Three equations might be obtained from these equations, and each derived equation would be in terms of all three coordinates. However, as above, this operation would have to be accomplished algebraically and that procedure in most cases would be awkward. Direct use of the equations as they stand appears easier.

Use of additional measurements to obtain additional equations

The logical extrapolation of the methods presented so far is to employ a number of readings in a given measurement sequence that is greater than the degree of the series employed by two or more. Alternatively, given a number of consecutive readings, one may employ in the mathematical procedures motion equations whose degree is less than the number of readings taken by two or more. As far as the solution iself is concerned, such a procedure does provide additional equations with a consequent increase in redundancy or reduction of the number of measurement stations. The redundancy may be employed in statistical methods of improving data. The number of stations in the system can be reduced to the number required to define the coordinate axes. One transmitting station and two receiving stations, or two transmitting stations and one receiving station may be employed in three dimensions. In two dimensions one transmitter and one receiver is adequate. In both of these systems an ambiguity of two exists which must be resolved by other conditions of the tracking situation.

In one-legged systems, where transmission is in one direction only, to or from, the moving vehicle, the additional equations made available by this technique may be employed to eliminate the effects of misalignment of vehicle and station local standard oscillators.

The case where measurements are made at only one station or in the moving vehicle relative to one transmitting station will be discussed under the subject Unidoppler.

In the discussion in this section there has been no departure from the conditions previously stated as to the motion of the object. Even though the degree of the motion equation employed is considerably less than the number of readings taken, the only assumptions are as before: the path of the object is continuous, the object cannot be in more than one place at a time, and in some instances that the path is single valued relative to certain coordinates or parameters. Useful position data may be obtained with any number of stations by making measurements of change of ranges, changes of differences of ranges between the moving object and two known points, or change of the sums of two such quantities. In succeeding sections systems will be discussed in which more explicit assumptions are made as to the motion of the object. Techniques of solving the sets of simultaneous equations have not been discussed.

Special Constraints

Special knowledge that concerns the path of the object or the timing of progress along the path can be of use in simplifying computation and measurement and in increasing the accuracy of a given system. This knowledge must concern some constraint or inhibition on the motion of the object. These special constraints can be strictly geometrical or they may include time as a parameter. A wide variety of constraints is possible. Some constraints are relative to established points or groups of points in the coordinate system. Others have no relationship to such points. Some discussion of the types of constraints is presented in the discussion of the Unidoppler system and the discussion there is applicable to the general Polystation Doppler configurations. Special knowledge may appear to be quite vague, yet be of use in the establishment of a method of position determination. As example, definite information that the motion of the object along each axis of the cartesian coordinate system can be expressed in a finite number of terms of a power series of time could be of value even if the exact degree of the equations were unknown. If the degree of the equations is known, this knowledge would constitute an even greater constraint and be even more useful.

There is a boundary area between operation with no knowledge of the motion of the object, other than that of continuity of path and being in one place at a time, and the existence of an absolute constraint such as motion in a straight line. In this in-between area probability must be considered. For example, consider the case of a single station Unidoppler system that performs a sequence of measurements indicating the change in the range to the object is occuring with equal range negative increments in equal time increments. The simplest conclusion is that the object is traveling at constant speed directly toward the station. Another possibility would be that the object is moving in a spiral of decreasing range. Another possibility is that the object is moving in a straight line that does not pass through the station point and moving at a speed that varies in such a manner that equal range increments occur in equal time. It would not be probable that any of these motions could occur without a restraint of some kind being supplied. Furthermore, the constraint would have to have a firm relationship to the station itself.

Unidoppler

The word "Unidoppler" is being used to denote an improved method of determining position or path characteristics, or both, of a moving object by making measurements at a single receiving station relative to only a single transmitting station. The transmitting station and the receiving station may be at the same point or they may be at different points, the system being dependent upon reflections from the moving object. The reflective system is called "two-legged" when the transmitter and the receiver are located at separate points and "one-legged" when the transmitter and the receiver are located at a single point. The method may also be employed as a one-legged system without reflection to determine the range between transmitter and receiver when either or both are in motion or to determine path characteristics when either or both are in motion.

In the Unidoppler method use is made of the assumptions of the general motion constraints and/or the special motion constraints, both described elsewhere in this document.

To establish a cartesian coordinate system for the single station Undoppler system the station itself may be chosen as the center of coordinates, the first position of the moving object may be used to define one of the axes. The second point may be assumed to determine the planes of the first and second axes and to determine the directions of these axes. The third point may be assumed to determine the direction of the third coordinate axis. Other combinations such as the first, middle, and last points might offer some advantage. When special constraints are admitted they may be of such a character as to establish a part or all of the coordinate system.

A single legged Unidoppler system operating without special constraints on the motion of the object can determine the range to a moving object by measuring a sufficient number of times with sufficient accuracy the change in the range to the object. Most assuredly this statement is based on practical considerations regarding the motion of the object. The situation where the range changes as a finite function of time is excluded. This condition would be detectable at the station and could only result from a constraint or highly improbable chance. In the event that a constraint does exist this situation also is detectable at the station provided the displacement of the object can be expressed as a continuous function of time.

A method of using the Unidoppler principle without special motion constraints is to express the displacement along each of the three axes as a separate finite time series with unknown coefficients. The degree of the time series is taken sufficiently high to provide the desired accuracy. A sufficient number of readings is taken over the interval in which it is desired to know the ranges. This number of readings is generally considerably in excess of the number of terms in the series. There are thus four new equations developed for each new reading. The number of readings taken is such that the total number of equations equals the total number of unknowns, coordinates of points and coefficients of the three time series.

The two-legged Unidoppler system has much the same characteristics as the single station Unidoppler in the manner of its response to unconstrained motion except that one of the axes of the cartesian coordinate system is defined by the axis between the two stations, and there is an ambiguity of two relative to the sign of this axis.

A wide variety of constraints may exist relative to the motion of practical targets or other objects. Knowledge of these constraints is generally useful in the Unidoppler system as in the Polystation Doppler systems. Typical of such constaints is the restriction of the motion of the object to a plane. A further constraint would be restriction of the motion of the object to a plane containing the Unidoppler system, or either the transmitter or the receiver of a two-legged Unidoppler system, or both stations of such a system. Confining the motion to a circle would be a similar constraint, and confining the circle to a plane including the Unidoppler station or one of the Unidoppler stations would be a further constraint. Confining the motion to constant speed or some other mathematically definable value or function constitutes a practical constraint. Motion existing as the result of a central force field such as the gravity field of the Earth is motion under restraint often definable by equations. These constraints provide additional equations to be employed in the set of equations which are solved simultaneously for position determination. These constraints are gained through knowledge of the mechanics of the motion of the object and knowledge of physical forces involved.

Use of information of these constraints generally permits a more accurate determination of position for a given accuracy in the prime measurement than can be obtained without such information. Also the size of the computer may sometimes be reduced from what it would have to be were there no constraints. Since the Unidoppler system necessarily leaves some or all coordinate axes indeterminate, there may be some constraints that would be useful in establishing one or more of the coordinate axes or reference points. Nothing written here is intended to indicate that Unidoppler systems cannot be built and operated without the knowledge or use of such constraints. The constraint equations may be employed in place of the more general motion or coordinate equations previously described, or may be employed in conjunction with one or more of them.

Unidoppler with Constant Speed Constraint

In FIG. 12 is shown a diagram of the space relationship or geometry of a doppler station capable of measuring change of range between itself and a target or cooperative vehicle moving along a straight line at constant speed. The speed of the target and therefore the increment L along the path between each reading is not known. The increment along the path is made equal between readings by taking the readings at equal time intervals. The equations describing the geometry and the measurements are shown. The solution for the first of the ranges is indicated and the solutions for the other ranges and the value of the increment along the path is obvious. It is to be noted again that in common with other doppler techniques presented in this and some of my other applications, the problem to be solved mathematically is presented in terms of static geometry although the physical situation described is certainly one of dynamics.

In FIG. 13 is shown a diagram of the space relationship or geometry of a doppler system consisting of a transmitter and a receiver operating cooperatively to measure the characteristics of the path of a target that is assumed to be traveling in a straight line at constant speed. The equations are presented in the figure for both the pertinent trigonometric relationships and the measurements that are performed by the system. It is seen that there are 13 equations and 13 unknowns, the 12 ranges and the increment of path. This equation set is perfectly solvable although the solution methods are somewhat more complicated than those of the simpler single-legged system shown in FIG. 12. Other methods employing different equations are available.

Orbit Determination by Unidoppler

The trajectory of an object traveling beyond the atmosphere in Earth orbit may be uniquely determined by a Unidoppler reflecting system employing a single transmitter at one point on the Earth and a single receiver located at a different point on the Earth. Continuous waves are emitted by the transmitter and reflected to the receiver by the satellite or missile. The receiving station is shown in FIG. 7. The changes of the length of the path traveled by the wave energy are measured and the readings corresponding to a number of successive points along the path of the object are noted. Since it is known that the motion of the object is elliptical in Earth orbit, the general equation for a circular ellipsoid is used as one of the motion equations. One of the foci of the ellipsoid is located at center of the Earth which point is made the origin of coordinates. Furthermore, it is known from the laws of motion that the motion of the object must lie entirely within a single plane which plane must include the Earth's center. Accordingly, the general equation of a plane through that point is employed as a second equation of motion. There are a total now of three exact equations for each reading point when one includes the single measurement equation resulting from the single measurement reading taken by the system at each reading point. There are only two equations corresponding to the point of initiation of the measurement sequence, the two motion equations. There can be no measurement equation corresponding to this point as at this point there has been no displacement to measure. There are two unknown coefficients associated with the shape of the ellipsoid. There are two unknown coefficients associated with the orientation of the ellipsoid. These same two unknown coefficients also orient the plane in conjunction with a third unknown coefficient. At this point of the discussion it may be seen that there are always a total of six more unknowns in the equation set than there are equations in the set. Additional equations may be obtained from the central force field relationships. One of these differential equations relating the cartesian coordinates and their respective differentials to the differential of time may be written for each path point of the measurement system including the initial pont. By subtraction the time differential and its coefficient may be eliminated producing a total number of equations of this type one less than the number of measurements performed. Simple arithmetic then requires that there be a total of seven measurements. The method of solution of this problem is similar to that of Newton and Raphson. The equations derived directly from the central force field are already applicable for use in forming the required matrix of coefficients of differentials of the unknowns. Initial approximations must be obtained as explained elsewhere in this specification.

Position Determination Using Central Force Field Restraint

A powerful and simple Unidoppler method of determining the path of a reflecting object in an Earth orbital path (ballistic) beyond the atmosphere employs only the laws of motion relating to the influence of a central force field in deriving the motion equations. The fact that the central force gravitational field of Earth is an inverse square field is not employed in this method of position determination and position prediction. Furthermore, neither the equation of the orbital path nor the constant parameters of such an equation is determined in this method. There is a consequent substantial reduction in the complexity of the method in comparison to those methods in which the ballistic path equations are first determined and the prediction of position performed on the basis of this equation. In this new method the equation of the plane of motion with undetermined coefficients is assumed and the coefficients of this equation are determined in the process of solution of the equation set. As a consequence of the central force field two simple independent differential equations may be written relating the position of a given trajectory point in cartesian coordinates to the differential of these dimensions and the differential of time. These two equations, the equation of the plane of the trajectory, and the single measurement equation may be written for each reading taken. Each of the central force field equations introduces a single unknown which is the same for every reading point. The plane of motion passing through the origin taken as the Earth's center introduces three unknowns. Each reading oint and the initial point introduces three unknowns which are the cartesian coordinates of the points.

For determination of the positions of the reading points or the initial point six consecutive readings are taken by a single receiving station located at one known position on the Earth's surface employing an illuminating transmitter located at a substantially different point on the Earth's surface. Continuous waves are emitted by the transmitter and reflected to the receiver by the object in motion. The block diagram of the receiving station is shown in FIG. 7. The changes in the length of the path traveled by the wave energy are measured and the readings corresponding to the successive points are noted. The time duration of each measurement is also noted. Six measurement equations are obtained from these readings. There is a total of 25 unknowns to be determined and a total of 25 equations to be solved simultaneously to determine the values of these unknowns.

To account for the rotation of the Earth the coordinates of the stations are changed for each reading point to correspond to the amount of rotation occurring during the measurement interval. No additional equations are required in the equation set to be solved simultaneously.

A solution procedure similar to that of Newton and Raphson is employed. The equation set to be solved simultaneously is as follows:

There are six equations of the type $$p_{ikj} = \sqrt{(x_j-a_{ij})^2+(y_j-b_{ij})^2+(z_j-c_{ij})^2} - \sqrt{(x_o-a_{io})^2+(y_o-b_{io})^2+(z_o-c_{io})^2} + \sqrt{(x_j-a_{kj})^2+(y_j-b_{kj})^2+(z_j-c_{kj})^2} - \sqrt{(x_o-a_{ko})^2+(y_o-b_{ko})^2+(z_o-c_{ko})^2}$$

There are seven equations of the type
$k_2 x_j - k_1 y_j + k_3 z_j = 0$
There are six differential equations of the type $x_j dz_j - z_j dx_j - x_o dz_o + z_o dx_o = q_j k_1 dT$
There are six differential equations of the type
$y_j dz_j - z_j dy_j - y_o dz_o + z_o dy_o = q_j k_2 dT$ Where:

$p_{ikj}$ is the meaured change in the length of the propagation path of the wave energy $x_j$, $y_j$, $z_j$ are the cartesian coordinates of the position of the object at the instant of the termination of the $j$th measurement (the instant of the $j$th reading).

$x_o$, $y_o$, $z_o$ are the cartesian coordinates of the position of the object at the instant of the initiation of the sequence of measurements.

$a_{ij}$, $b_{ij}$, $c_{ij}$ are the known coordinates of the position of the receiver at the time of the termination of the $j$th measurement.

$a_{io}$, $b_{io}$, $c_{io}$ are the known coordinates of the position of the receiver at the instant of time of the initiation of the sequence of measurements.

$a_{kj}$, $b_{kj}$, $c_{ik}$ are the known coordinates of the position of the transmitter at the instant of time of the termination of the $j$th measurement.

$a_{ko}$, $b_{ko}$, $c_{ko}$ are the known coordinates of the position of the transmitter $j$th the instant of time of the initiation of the sequence of measurements.

$T$ is the time interval of the first measurement, the time taken for the moving object to travel from the initial point where the measurement sequence is started to the pont where the first measurement is terminated by the first reading.

$k_1$ and $k_2$ are constants of the equations that are derived from the fact that the moving object is subject to a central force field.

$k_3$ is a constant needed in addition to $k_1$ and $k_2$ to determine the plane of motion which plane passes through the center of the Earth.

$dx$, $dy$, $dz$, $dt$ are the differentials of the indicated quantities.

The equations of the first two types must be differentiated to form the set of differential equations necessary in the solution which is similar to the Newton-Raphson method. The equations of the last two types may be employed directly in the set of differential equations.

$j$ is the number designating the position of a particular reading or measurement in the sequence of readings or measurements.

$q_j$ is the time interval of the $j$th measurement expressed as a multiplier of the time interval T of the first measurement.

The method employing only the central force equations, the plane equation, and the measurement equations may be modified to eliminate the increment of time in the differential equations by subtraction of one of the equations from one or more of the other equations involving this term. Conveniently the constants $k_1$ and $k_2$ may be eliminated at the same time by suitable subtractions. In this case the number of measurements required is increased to seven. The equation for the plane is written entirely in terms of its own constants.

$$Ax_j + By j + Cz_j = 0$$

The equations resulting from central force considerations may be written
$x_j dz_j - z_j dx_j - q_j(x_1 dz_1 - z_1 dx_1) + (q_j-1)(x_o dz_o - z_o dx_o) = 0$ $$y_j dz_j - z_j dy_j - q_j(y_1 dz_1 - z_1 dy_1) + (q_j-1)(y_o dz_o - z_o dy_o) = 0$$

The measurement equations of course remain the same. There is a reduction of two equations and a reduction of only one unknown so it is necessary to increase the number of measurements by one.

Prediction Using Central Force Field

The prediction of the position of the moving object corresponding to any instant of time after the completion of the sequence of readings is accomplished by including the coordinates of the predicted point and the time corresponding to the desired predicted position in the equation set which relates the positions of the object at each of the various reading points, the position of the object at the time of initiation of the measurement sequence, the central force field, and the measurements. There are introduced into the equation set three unknowns more than those required for position determination. These three additional unknowns are the three coordinates of the predicted point. It was shown in the section on Position Determination Employing Central Force Field as a Constraint that for each new point added to the measurement system, there are three equations developed in addition to the equation resulting from the doppler measurement. When there is no measurement corresponding to a given point, such as a predicted point, three equations can still be written corresponding to that particular point. These equations are two equations corresponding to the central force field and one equation corresponding to the plane of motion. Therefore, as many new points may be added in the system of equations as desired. These points may be interpolated or extrapolated points. That is, they may lie within or without the measurement sequence.

Multiple Unidoppler Systems

When the ranges from three or more stations to a point on a target path have been determined, the position of the point is defined. Expression of the position of the point in cartesian coordinates is merely a problem of coorindate transformation from the three ranges to the three cartesian coordinates. Thus a single receiving station operating in conjunction with two transmitters is capable of resolving the ambiguities from more than one target, that is, associating the echoes from the two transmitters with each other so that each pair of echoes is referenced to a single target. The system is then capable of determining the positions of each of the separate targets. Fewer readings need be taken if there is no need to resolve ambiguity as equations resulting from reference to two or more stations may be solved simultaneously with the path equations.

A system composed of more than two stations may operate in the manner of several separate Unidoppler systems of one or two stations each in order to obtain a preliminary estimate of the position of the target by a simpler method not itself requiring a preliminary estimate. The results of the multiple Unidoppler solutions are then employed as the initial estimate in an iterative procedure to obtain a position determination of the necessary accuracy. Use of this method may be made in cases where assumptions of a particular condition or restraint on the path of the moving object may be accepted for purposes of initial approximation but not acceptable for the final position determination.

Ambiguity Resolution by Unidoppler

An important aspect of the Unidoppler method lies in its use to resolve ambiguities arising from a number of objects simultaneously appearing in the field of a reflective system with more than two stations. In the resolution of ambiguity the Unidoppler technique is employed to determine some particular characteristic of the path corresponding to a given sequence of measurements performed by a single station relative to another single station which will permit the identification of that path, and consequently of that particular target, by other receiving stations of the system or relative to other transmitters. The resolution of the ambiguity is then merely the matching of path characteristics derived individually by the separate measurement instruments.

A sample of this technique is the determination of the velocity of a moving object when it is known, or it may be assumed, that the object is traveling in a straight line with constant speed. Another sample of an assumed path for this purpose is that of an ellipse with the moving object traveling under the influence of an inverse square central force field.

Similar geometrical configurations can be evolved for other typical assumed paths such as segments of circles. The more complicated the path the greater the number of readings that must be taken and the greater the complexity of the solution.

When this process is carried out for two or more unidoppler systems having at least one of the their stations in common, there is a method of ambiguity resolution available by the comparison of the ranges to the target from the common station. These ranges would be determined separately by reference to two different cooperating stations. Comparison of the ranges or sets of ranges thus derived resolves the ambiguity resultant from a plurality of targets being observed simultaneously. Thus there are shown two characteristics that can be compared, the lengths or increments of the path and the ranges to the path points.

Methods with Known Point or Points

When the constraints of the motion of the moving object are combined with knowledge of one or more positions of the object along its path there results an obvious simplification of the methods discussed in this application. Such a known point might be the point of launch on a missile range. Such points might also be obtainable from other systems. These methods are readily derived from the other methods set forth in this application, and one skilled in the art may be expected to make the modifications of the methods without difficulty.

Initial Approximations

Since the sets of simultaneous equations employed in many of the doppler methods presented in this document are nonlinear, it is often convenient to employ one of several iterative techniques. One such method is the well known Newton-Raphson method. Iterative types of solution generally require an initial approximation of the solutions to be on hand at the outset of the computation. In the tracking operation iterative techniques are particularly convenient because of the fact that an excellent approximation is already available. As each new set of data is supplied from the measurements it is incorporated into the set of data already on hand and the solution of the set of data on hand is employed as an approximation of the solution of the newly formed set. An iterative method is then employed to determine the new solution accurately. If the data is taken frequently enough it may only be necessary to perform one iteration as each new set of data is acquired. This method is very valuable in applications where it is desired to obtain position data in real time.

Initial approximations may be obtained through specialized sources, such as, dead reckoning, orbital information, rough antenna fixes, or through data supplied through other systems. Tables may be employed to attain initial approximations and such tables may be included in the memory of the digital computer. In all such methods it is generally of advantage to choose the initial solution in such a manner that the corresponding values of approximate input data derived directly from the assumed solution data have the same signs and magnitude sequence as the measured input data.

Another method of obtaining an initial approximation is through the use of an auxiliary analog computer.

A variety of methods of determining one or more position coordinates are described in this application. These methods are of varying complexity. Sometimes it is practical to employ a simpler one of these mehtods to provide an initial estimate for the iterative solution of a more complicated method. Such a method may be the application of the method using the assumption of circular motion at constant velocity, the method being applied simultaneously but separately relative to three stations of the system and trilateration being applied to this data to obtain an approximation of position for use in a more accurate method employing, for example, four stations.

Some of these methods, for example methods employing the coordinate equations, vary from others of the same type only by the number of measurements taken and the consequent value of the degree of the curve of the path that may be approximated. In such instances a method of obtaining initial approximations for a final detailed solution is to employ a fewer number of readings in a general solution of the same type. It is easier to make a reasonable approximation with the smaller number of coordinates involved. The computation may be repeated employing more readings each time. It may be desirable to make initial estimates using relatively small increments.

In some three station methods, for example those methods employing the coordinate equations normally operating in three dimensions, initial estimates of position might more easily be obtained using only two of the stations at a time, thereby reducing the number of estimated unknowns by one-third. The results of the two dimension solutions may then be combined to obtain a three dimensional solution.

Perturbation Method of Computating Error Matrix

An improved iterative method of solving sets of non-linear equations such as those frequently present in the position and path determining methods described in this application is to derive the error matrix, or differential matrix, by performing a set of probing calculations rather than computing the first partial derivatives or computing the first and higher order partial derivatives. This perturbation method consists of the following steps:

1. An approximate solution is assumed.
2. The synthetic "input" or "measurement" data is then computed on the basis of the assumed solution.
3. The solution is then moved a finite increment along one of the coordinate axes.
4. The synthetic input data is then recomputed.
5. The difference between the computed values of the input data is then taken by subtraction. The ratio of this difference to the perturbation increment of the solution point is the ratio employed as one of the elements in the "error matrix", or differential matrix.
6. The process is repeated for each dimension of the equation set.

As in the Newton-Raphson method, the inverted error matrix is multiplied by the error vector to obtain a new approximation. The error vector is obtained as in Newton-Raphson by subtracting the results of Step 2 from the measured input data.

The error matrix described above also provides a more realistic value of anticipated errors than the matrix of first partial derivatives in some applications.

The perturbation method has the following advantages depending upon the application:
1. Easier programming of the computer.
2. Simpler Computer.
3. More rapid convergence.

Iterative Methods Without Initial Approximation

The method of computation described here is applicable to all of the methods of position and path determination described in this application, and though iterative does not require that separate initial approximations of the final solution be obtained. In this method any solution is assumed and the input data and the error matrix calculated. The error matrix may be calculated by the perturbation method or the first partial derivatives may be employed. The input data vector is then advanced by a small increment in the direction of the measured data vector. The iterative method is then employed to provide a solution on the new input data vector. The new input vector is in turn advanced toward the measured data vector and the process repeated until the calculated input data and the measured input data coincide. The solution is sort of towed along as the input data vector is adjusted toward the true measured data. The path of adjustment of the input vector is guided by observation of the error matrix.

Statistical Techniques

The capability of tracking systems may sometimes be extended through the application of probability or statistical techniques. It is not a purpose of this application to expound on these well known methods. One such method is called the method of least squares. In this method more data is taken than is required to determine the unknown quantities. The solution is the result of a mathematical compromise of all of the data collected. It is a part of my invention to employ such methods when they are beneficially applicable to enhance the performance, accuracy or capability of the methods described herein. However, such methods, least squares for example, generally increase the requirements on the computer substantially.

Systems Employing Acoustic or Other Waves

Although selected applications of my invention illustrated in this application have been confined to operation with electromagnetic waves, none of the principles of my invention vary when other waves such as acoustic waves are employed, regardless of the medium through which such waves are propagated. Furthermore the principles of my invention do not vary with the frequency of the electromagnetic, acoustic, or other waves employed. One skilled in the electronic art can easily adapt the principles of my invention to a variety of types of waves propagated in a variety of media. The use of both coherent and noncoherent light to perform the fundamental measurements is also within the scope of my invention. Thus the use of particles or quanta in performing the fundamental measurements also does not restrain or bound or alter my invention. In essence any mehtod whatever may be employed to perform the fundamental measurements of geometrical variation within the scope of my invention.

Unknowns and the Equation Set

My method is exceedingly flexible in its ability to incorporate error producing phenomenon within the set of simultaneous equations descriptive of the particular system. It is only necessary that there be a systematic relationship between the phenomenon and the coordinates of the moving elements of the system. This relationship may be indirect,, as through the argument of the series constituting the motion equations. Such an unknown might be the variation of the frequency alignment between two separate oscillators. The difference in frequency of the two oscillators may be expressed as a time series with unknown coefficients. This time series can be incorporated in the equation set containing equations expressing the coordinates as power series having time as the argument. The coefficients of the frequency difference time series is then also attainable as the equation set is solved for the coordinates of the moving body. Other unknowns which may be expressed as functions of the space coordinates may similarly be accommodated. These additional unknowns may be introduced directly into either the measurement equations or the motion equations, or they may be introduced by additional equations, or they may be introduced by a combination of these. These additional unknowns may also be the result of intentional design of the system in which some desired information is transferred or acquired by the process. This technique is applicable to all of the embodiments of my invention.

There is some flexibility in the writing of the equations constituting the set of simultaneous equations used in the method, particularly the motion equations. As an example, instead of setting a coordinate equal to a power series of time one may set the measured value of elapsed time equal to a power series of the coordinate or the power series of a function of the coordinate. Examples:

$t_j = a_0 x_0 + a_1 x_j + a_2 x_j^2 + a_3 x_j^3 +$ $t_j = a_0 + a_1 (x_j - x_0) + a_2 (x_j - x_0)^2 + a_3 (x_j - x_0)^3 +$ $t_j = a_0 + a_1(x_j^2 + y_j^2 + z_j^2)^{1/2} + a_2(x_j^2 + y_j^2 + z_j^2) + a_3(x_j^2 + y_j^2 + z_j^2)^{3/2} +$

Care must be exercised that the equations are valid over the region of motion corresponding to the measurement sequence. Where specific physical forces are known in some detail the number of terms of the series may sometimes be reduced and one type of series may be found to be of greater advantage than another in the computing process. Often the equation set contains equations additional to the measurement equations and the motion equations. These equations of course must contain at least some of the unknowns present in the other two types of equations. These equations may be descriptive of some geometrical relationship not directly expressed in the so-called motion equations. Though these relationships may be expressable in the motion equations, it is sometimes more convenient to introduce them as separate equations in the equation set. Indeed this is often the only practical procedure. These additional equations may also serve to link the unknowns of one type of equation already present in the equation set to the unknowns in antoher type of equations in the set.

These principles set forth here for systems in which incremental changes of geometrical parameters are measured are equally valid in systems in which rates of change of geometric parameters are meausred. Duplication of the entire text of the application in terms of derivatives and introducing the appropriate modifications would add significantly to its bulk and one familiar with the art and studied in the method as presented in this application and in my previous application, Ser. No 86,770, should have no difficulty designing systems employing derivatives and differentials rather than increments.

Ambiguity Elimination

Ambiguity here refers to the possibility of a number of differnt target positions existing any of which could correspond to a given set of measurement values. Such situations can be selected to occur in both single target and multiple target systems and in one-legged and two-legged varieties of these systems. In general the condition arises in one-legged systems only when there exists in the system some unusual condition of symmetry. Usually the symmetry must be not only with respect to the station positions relative to each other, but also with respect to the target positions relative to the symmetrical station disposition. The probability of such occurrences is remote and easily remedied or made impossible by changing the positions of the stations. The more difficult condition of ambiguity occurs as a result of use of the system to acquire and track a plurality of moving objects simultaneously. One general approach to all problems of ambiguity is to perform measurements additional to the number of measurements that would be required for the unique position determination were there no problem of ambiguity. This additional data may be taken either as additional measurements performed with the same set of stations or it may be taken as additional measurements performed with an additional station. The amount of additional data required is generally very small. At least three methods of introducing the additional data into the system are at hand. One method is the Unidoppler technique already described in this application, a second procedure is by correlation initially described in my patent application Ser. No. 86,770, a third method is by simultaneous solution of a single set of simultaneous equations comprising the coordinates of all the positions of all the moving bodies. Instrumental techniques of avoiding the occurrence of ambiguity in the measured data are also at hand, some of these being described in the previous patent application, Ser. No. 86,770.

Correlation techniques may be employed in several different ways. One method of categorizing these methods is by whether the correlation process is accomplished before or after the computations of position. In the one case the data is separated according to the individual target by correlation prior to the computation of the position of the target. In the other case all possible positions of the target are computed and the correlations performed subsequently. In the latter method the various positions are computed with two different sets of data. The first set is that set of data that would have been sufficient had there been no ambiguity and had there been no additional data taken. The computation is also performed in the same manner using a set of data that incorporates the additional data and generally eliminates some of the data used in the other solution. The various solutions of the two groups of solution are compared to find those solutions whose position determinations for common points are the same. The general method is the same for both those systems employing additional data taken with the same stations and those systems employing additional data taken with additional stations.

Ambiguity may also be avoided instrumentally by several methods, some of which were discussed in the previous application. One method of resolving ambiguity in a reflective system such as the system described in Two-Legged System through the comparison of the phases of signals from the same target as received by two or more separate antennas displaced from each other at the receiving station. Only those signals having the same phase differential between the separate antennas are likely to be from the same target. Two targets lying in the same direction from the receiving station will cause ambiguity but this condition generally could not last long enough to produce practical confusion in a system of adequate differential phase resolution. A plurality of such stations may be used in the system to improve resolution; and the principle may be extended to transmitting stations and to the observation of differential amplitudes as well as differential phases.

Simultaneous Solution for Multiple Targets

In any of the systems for the determination of the positions and motions of a plurality of moving objects simultaneously, an equation set may be employed which relates the significant positions and the corresponding measurements of all of the moving bodies. Simultaneous determination of the position coordinates of all of the moving bodies is accomplished by the simultaneous solution of the single equation set. To form this set of simultaneous independent equations, equations are included which relate the coordinates of the significant positions of one moving object to the coordinates of the significant positions of one or more other moving objects. Such equations may be either motion equations or measurement equations; they may be natural, or synthesized from several natural equations. Natural equations may be defined as those equations derived directly from some physical relationship or measurement.

There is a variety of physical relationships from which suitable motion equations for this purpose may be derived, some involving time as a parameter and others not involving time as a parameter. Examples: the spacing between two moving objects may be expressed as a function of time. The difference of the coordinates of two moving objects along one axis of the coordinate system may be expressed as a function of time or as a function of the distance between the two objects. In instances where there is a physical relationship by virtue of existing or previous forces, the motion equations relating moving objects to each other may be a good deal simpler than the general series expressions that one may employ for lack of some more definitive expression. The missile breakup problem is a case in point.

If a missile is exploded in free space the parts are generally subjected to an initial outward impulse of relatively short duration. The continued relative motion of the parts is then one of separation at constant speed. The corresponding motion equation can be a very simple linear expression. Any two objects coasting in free space have linear expressions relating the differences in their displacements along the three coordinate axes. The presence of nearby gravitational bodies can produce a relative acceleration between two bodies. However, in the important case of satellites and other ballistic bodies expressions of the second and third degree should be adequate for most purposes. Motion equations that relate the motions of significant positions of separate simultaneous moving objects will be called "multiple target motion equations". The measurement equations for such a multiple target solution may be the same as employed for single target position determination, the measurements being performed and expressed for each of the moving bodies independently of the other moving bodies. Equations may also be employed that each comprise the measurements relative to two or more moving bodies. Such expressions may be obtained by combining the separate direct measurements related to separate moving objects or may be the product of instrumentalities sensitive to such relationships. Such a phenomenon observed by suitable instrumentation is the difference in the changes of the simultaneous ranges to two separate targets. Such equations may be called "multiple target measurement equations". These equations may be employed with the multiple target motion equations or the single target motion equations, and they may also be employed to form sets composed entirely of the one type.

In a reflective system comprising one receiving station in conjunction with several space separated transmitters to determine the positions of each of a group of reflective targets in the field of the system, ambiguity of association of the various targets with their particular echo signals detected at the receiving station may be avoided by simultaneous solution of a set of equations comprising completely or in part equations synthesized from the measurement equations. To understand the problem consider the measurements derived from the first transmitter to be a base from which to assign a number to each of the targets. There is no ambiguity since this group of echoes is the first considered. The measurement equations relative to this first transmitter are written as previously described under Two-Legged System in this application. The equations relative to the second transmitter cannot be included in the set because it is not know which measurements to associate with which of the symbols assigned relative to the measurements of the first transmitter. One can derive an equation relating the measurements of the second transmitter to the coordinates of the targets that includes the ambiguity by simply adding together all the left hand sides and all the right hand sides of the equations resulting from the measurements of the second transmitter. In this process all of the measurement values are lumped into a single value and the other side of the equation comprises the coordinates of all of the targets. One equation is thus derived for each additional transmitter. Three additional transmitters are required for each additional target added to the group. The ambiguity problem is thus effectively bypassed and actually does not arise in the procedure.

To increase the ratio of derived equations to transmitters, further operations may be performed in the measurement equations of the second and successive transmitters. As an example each of the measurement equations associated with a single pair of significant epochs may be squared. Both sides of the equation are squared separately. The square root of the sums of these squared measurement equations is the new equation. All of the measurement values are each squared and the square root of the sum of these squares is the single value forming one side of the equation. As with the simple summing of equations described above the other side of the equation contains the coordinates of all of the targets corresponding to the system measurement taken between any two significant epochs. A third equation may be similarly formed by taking the cube root of the sums of the cubes and so forth. As many equations may be formed as required to make the total number of equations resultant from the measurements relative to the second transmitter equal to the number of measurements made with that transmitter, with number is also equal to the number of targets. The process is identical for measurements relative to each of the successive significant epochs. Each of the new equations thus derived is independent and may be used in the equation set soluble for each of the coordinates of each of the targets at each significant epoch. The square and other roots of these equations are taken in order to avoid the introduction of a sign ambiguity. The maintenance of a sign conventional otherwise enforced may serve as well.

Another example of a multiple target measurement equation is an equation formed by writing simple measurement equations relative to each target as exponential equations and then adding the several exponential equations so derived to form the desired single equation. A second exponential equation may be obtained by multiplying the simple measurement equations by a constant before forming the exponential equations. A third equation may be formed by multiplying the simple equations through by a constant different from the one previously employed. Thus any number of exponential multiple target measurement equations may be synthesized. The proper number of equations to synthesize is determined by the number and independence of the included measurement data.

Part of the art of synthesizing a multiple target measurement equation for the purpose of avoiding ambiguity is to form an equation that is perfectly ambiguous in the target designations of the unknowns that it comprises. A second part of the art is to include in the equation all of the various target coordinates pertinate to the description of the positions of all of the targets at the two significant epochs relative to which the measurements comprised by the equation were performed.

Universal Space Sensor

A complete system for use with moving space objects must be capable of performing a variety of interrelated functions on a world wide basis in order to provide the necessary detection, tracking, navigation and guidance functions required of the sensor. The various simplified embodiments of my invention presented in this application form interrelated parts of the universal space sensor. In this sensor some of the reference points are satellite vehicles containing receiving equipment, transmitters, and computers. These satellite vehicles are able to receive the reflections from other space vehicles of the illuminating signals emitted by large ground stations, the direct signals from ground stations, and direct signals from other space transmitters. With this information such a vehicle can determine its own position, the positions of the other space vehicles, the positions of ground stations of the system and other ground stations. In the process of position determination it also performs the function of ambiguity resolution as required.

With adequate communications with its ground base this satellite sentinel may employ its position and motion to advantage in providing surveillance and tracking in the defense of ground areas. The protected ground areas employing other parts of the sensor are simultaneously capable of employing communicated data from said satellite and incorporating signals to and from the satellite in other simultaneous measurements. In this manner the range and volume of the space sensor may be extended.

The sensor may employ its separate receiving stations in a variety of combinations of stationary or moving units to detect the presence of and determine the motion and position of vehicles and stations and other objects emitting jamming radiation or radiation resulting from communications or radar which radiation may be friendly or unfriendly or natural. In this part of the operation the detected modulation envelope of the received signal and the timing are transmitted from each receiving station or vehicle to a central point where the signals may be compared. Identical points are recognized on each of the separate signals and the corresponding doppler phenomenon measured and the position and motion of the emitter determined therefrom.

While only the direct measurement of geometrical changes have been specifically described in this application functions of these changes are also to be incorporated in the sets of simultaneous equations appropriate to the various systems. Values for the functions may be obtained through the combination of the doppler measurements described in this application or from direct measurements. Operation typical of such direct measurements occurs in the measurement of the differences of the doppler effect relative to a plurality of moving objects and the simultaneous solutions for their relative positions and for the position of the group of objects. In handling a multiplicity of target simultaneously the sensor also employs equations relating the motions of the several objects to each other, the target motion equations described elsewhere in this application.

The sensor also provides indication of the relative position of two missiles, one a target and the other a counter target missile and provides miss distance indications for adjusting fire and timing explosion.

This same method may be directly applied to undersea warfare employing sonic or other waves and suitable transducers. The signal analysis and data processing parts of the method are essentially the same and one familiar with the art would have little difficulty in the design of an underwater sensor using my method.

AUTOMATIC COMPUTATION

In essentially every practical application of the instant invention the mathematical processes are sufficiently complicated that it is necessary to employ automatic computation. The instant invention comprises such methods of automatic computation and comprises such means of automatic computation. It is emphasized that no mental processes are involved in any part of the instant invention and no part of the instant specification is to be interpreted or construed as describing or reciting such mental processes or mental steps or mental elements. The instant invention is based upon a fundamental fact of physics, mechanics, geometry, and mathematics first discovered and disclosed by the applicant. However it is unnecessary to repeat the applicant's mental processes exercised in the process of the basic discovery in the practice and use of the applicant's invented apparatus and nonmental processes.

A variety of methods and means are comprised in the instant invention for performing all the functions necessary to the computation. In common parlance these various apparatuses may roughly be divided into two groups, analog and digital. In each group there are general purpose machines and special purpose machines. In general the special purpose machine is constructed to form, in combination with other computing and/or noncomputing apparatus, a system of apparatus to carry out a specific function or a limited number of functions. The cooperative apparatus may involve measurements or may involve a measurement function. In any case the computing apparatus, analog or digital, is connected to the other apparatus through shafts or wires or magnetic tape, pneumatic tubes or other such means to convey signals to and from the computer. In general the special purpose machine either analog or digital must be constructed especially for the purpose of the system into which it is to be employed. The building blocks of which it is constructed vary. In a simple case a few modest, more or less permanent, changes in a general purpose machine convert it to special purpose computer. In other cases a special purpose computer, either analog or digital, must be constructed essentially from resistors, capacitors, transistors, etc., the entire design being so specialized that it must be accomplished as an entirely original design. Some special purpose machines are so designed that they can be called upon to serve a plurality of alternate functions. Furthermore the special purpose machine can be comprised of a number of rather involved subelements which can perform one or more rather complicated functions as required. The general purpose machine is essentially a special purpose machine that is so constructed that it can perform an essentially unlimited number of functions when proper signals are fed into it. The more complex the signals that are fed into such a machine the greater is the variety of the functions that it can perform. The larger, the more complex the machine, the more complex are the signals that can effectively be fed into it. It is of course obvious that no matter how complicated such a machine can be there is no possibility that it can perform any mental operation or mental function whatsoever. All mental processes can only be accomplished in the animal mind. It is emphasized that this specification contains no recitation or description of any element of any machine, device, or method of performing any mental function nor any function dependent upon such mental process. In practical application of the invention either analog machine or digital machine computation are employed.

My method is sometimes practiced by arranging the internal circuitry of an apparatus already in existence by means of changing the state of being of certain elements within the system and thus altering the machine so that it is suitable for performing automatically and without human control the entire computation procedure of my invention. My invented method includes such a programmed machine but of course does not include any mental step that may have gone into the invention of such a machine nor into any mental steps that may have gone into planning conceiving, inventing or arranging the program of the computer. Nor does my invention include the display of such planning on paper. The electro mechanical means of arranging the general purpose computer to the specific purpose of my invention includes in various modes magnetic tapes, magnetic drums and punched cards. In such instances the computing part of my invention begins after the cards or tape are inserted into the digital computer and the machine is turned "on". Therefore it is readily seen that there is no mental step described as a part of my invented apparatus or invented method. The measurement data may also be fed directly into the computer automatically through shift registers as shown in FIG. 7 and as shown in FIG. 8. Also, direct connection to the computer through the readout device is shown in FIG. 10.

One such computing machine is the IBM 704, another is the IBM 7090. Both of these machines were in existence well in advance of the filing of the patent application Ser. No. 86,770 and the patent application Ser. No. 278,191.

No matter what mechanism is employed to introduce the measurement data into the computing means, tapes, cards, etc. or direct electrical connection as shown in FIGS. 7 and 8, some physical representation of the measured magnitudes is generated and automatically introduced into the computer. Similarly physical representations are employed to introduce other required data (station coordinates) and the computer outputs a physical representation (lists, charts, etc.) of the output position-motion information.

The advantage of the general programmable digital computer in connection with the instant invention is that it enables one to conveniently carry out the electro-mechanical programming elements of my invention automatically and without human intervention, much less mental activity, once the on switch is thrown to the on position.

In the manner of operation of the mode of my invention making use of the general purpose computer there has been prepared a deck of cards or a magnetic tape which by holes punched in the card or magnetic deformations in the tape contains the information that is to be fed into the computing machine. This version of my invention is initiated by pushing the on button. At the moment the on button is pushed my process begins and proceeds entirely without human intervention or mental processes of any sort. The cards or the magnetic tape pass through sensing elements which develop signals which are fed to the storage and logic elements of the computer which proceeds to complete my invented process.

Light of the Specification

The entire light of this specification is directed toward nonmental processes and no interpretation or extension of the words or discussion herein should convey the slightest idea that my invention includes any mental process or other mystique whatsoever. The light of this specification is entirely concerned with practical automatic processes.

SUMMARY

Particular examples of my invention have been presented in this specification. It is obvious that the basic principles can be applied in the creation of a wide variety of multistatic systems for tracking moving objects. Operation may be in two-dimensional space or in three dimensional space, the number of stations varying accordingly. Wave transmission may be toward the moving object from the reference points. For example receiving equipment may be installed aboard the moving object sensitive to waves emitted by transmitters located at the reference points. This circumstance would correspond to the application of navigation of a moving vehicle. Conversely my method may be employed to determine the position-motion state of a moving transmitter which then becomes the moving object. Receiving apparatus located at the reference points and connected to a single computing apparatus completes the system. Further options exist in reflective types of systems. For instance one may employ a single transmitter to illuminate the moving reflecting object and receivers at the reference points. The illumination transmitter may be at one of the reference points or elsewhere. FIG. 9 shows a system in which the illumination is furnished by three transmitters, one located at each reference point. A common receiving equipment is located at a point remote from any of the reference points. Obviously the receiving equipment must be sensitive to the reflected emanations of all of the transmitters, i.e. it must have three channels. The receiver equipment could have been located at one of the reference points without change of my invention. FIG. 1 shows the system arranged so that each reference point is the location of a transmitter-receiver combination so that illumination is provided at each reference point for the receiver located at that reference point. An obvious variation of my invention is the use of three receiver channels at each of the stations (reference points) shown in FIG. 1. One channel at each station detects the echoed signals of the colocated transmitter while the other two channels detect the echoed signals of the transmitters located at the other two reference points (stations). Further obvious variation is for there to be two receiving channels at each receiving station sensitive only to the echoed signals of the transmitters not colocated with the receivers sensitive to their echoed emissions. This latter arrangement is convenient in avoiding the problem of isolating the receiver from the direct signal from the transmitter which can occasionally be troublesome.

In order to be descriptive of the invention in brief and without recitation of the vast number of possible combinations one may simply state that wave communications means are located at each reference point. My invention is invariant as to whether these wave communications means are transmitters or receivers. It is obvious that the moving object can be a reflecting object as it would be in the case of a missile detection system. It is also apparent that communications means on board the moving object or vehicle can be a transmitter or a receiver depending upon the purposes of the particular system, i.e. air traffic control or air navigation.

An essential element of my invention is the transmission of waves across the space between each reference point and the moving object, no matter which direction the waves travel. It is further essential that the waves be detected and their doppler characteristic be measured. My invention is not altered by the choice of the point or points of the system at which the detection is accomplished nor is it altered by the place at which the computation is performed.

Each of the example systems shown in FIG. 1, FIG. 6, and FIG. 9 are dependent upon waves being transmitted in the space between the point of the moving object location and the reference points. These modifications of my instant invention are more limited than my previous invention (patent application Ser. No. 86,770) in that it is specialized by employing (in a system for 3-space operation) only three essential wave paths and further limited in employing only doppler type measurements or observations (regardless of whether continuous waves are employed or whether the waves are modulated by tones or by pulse as shown in FIG. 10).

While modification of my instant invention shown in FIG. 9 shows four stations it is obvious that there are only three doppler loops or wave paths. The system comprising the ancillary positioning of one terminal of the communications loop remote from any of the three primary reference points at which are located other terminals of the three essential wave paths is a modification of the same instant invention as the modification shown in FIG. 1 comprising but three stations. Thus it is apparent that these modifications of my invention may be described briefly in a very definite fashion by recitation of the three reference points without introducing vagueness relative to the fourth station in those modifications where it is appropriate.

While a system of circuits is shown for tracking analog signals, measuring their Doppler variations and preparing the data for introduction to the computer, it is a perfectly practical modification of my invention to employ digital techniques for this entire process. The data processing is initiated with a sampling operation performed at the output of the filtered mixer. Somewhat greater speed and flexibility is offered by this computer type of method.

At each receiver there is mixer and filter circuitry shown in FIGS. 2, 3, 7, and 11 for translating the signal to a spectrum of reduced frequency more convenient for measurement purposes. Such reduction may be to the zero frequency as shown in FIG. 3 or the spectrum may be reduced in frequency so that it is centered about some bias frequency as shown in FIGS. 1, 2, 7, and 11. This bias frequency may or may not be as high as a conventional IF frequency. In any case the rate of phase change of the signal so created is linearly dependent upon the rate of change of the distance of the propagation path-one-legged or two-legged-of the doppler modified waves. Similarly the rate of change of the group phase of the sinusoidal components of the pulse in a pulse system such as shown in FIG. 10 may be said to be linearly dependent upon the rate of change of distance of the propagation path — one-legged or two-legged — of the doppler modified pulse signals.

A detailed discussion of the meaning of the position-motion state is contained in my above-mentioned Pat. No. 3,445,847 to which reference is made.

The invention having been described in detail in accordance with the requirements of the patent Statutes, various other changes and modifications may suggest themselves to those skilled in this art, and it is intended that such changes and modifications shall fall within the spirit and scope of the appended claims.

I claim:

1. In an automatic position determining system a method of determining in three-dimensional space the position-motion state of a moving vehicle relative to well separated reference points whose positions are known and relative to which the position of said vehicle is entirely unknown at all points along its path including the end points of said path, waves being simultaneously transmitted across the entirely unknown distances between said moving vehicle and said reference points, doppler sensitive means being used to perform simultaneous measurements on said waves, which measurements collectively define physically the position-motion state of said moving vehicle, the position-motion information contained in said measurements being converted to a more useful coordinate system relative to which the position-motion states of said reference points are known, said system comprising wave communications apparatuses at the locations of all of the reference points and aboard the moving vehicle, said method comprising the following non-mental elements:
   1. establishing at the locations of each of three reference points wave communications means cooperative with wave communications means installed aboard said moving vehicle;
   2. installing aboard said moving vehicle wave communications means cooperative with wave communications means established at each of said three reference points;
   3. transmitting waves between said cooperative communications apparatuses;
   4. detecting said waves using mixing means and filter means to create alternating current electrical signals whose instantaneous time rates of phase change are linearly dependent upon the time rates of change of the simultaneous distances between said reference points and said moving vehicle;
   5. automatically measuring the magnitudes of the time variations of phase of said alternating current electrical signals and generating physical representations of the magnitudes resultant of said measuring;
   6. automatically introducing said physical representations into automatic computing means;
   7. introducing into said automatic computing means physical representations of the dimensions of the position-motion state of said reference points;
   8. computing automatically in said automatic computing means the dimensions of the position-motion state of said moving vehicle in said useful coordinate system;
   9. automatically extracting from said automatic computing means a physical representation of said dimension of the position-motion state of said vehicle.

2. A method as recited in claim 1 further limited in that the wave communications means established at each said reference point is a wave transmitting means, further limited in that the wave communications means installed on board said moving vehicle is a wave receiving means sensitive to the waves emitted by each of said wave transmitting means.

3. A method as recited in claim 1 further limited in that the wave communications means installed on board said moving vehicle is a wave transmitting means, further limited in that the wave communications means established at each of said receiving means is a wave receiving means sensitive to the waves emitted by said transmitting means, said receiving means being connected by communications means to a common location, and further limited in performing the recited automatic functions at said common location.

4. In an automatic position determining system a method of determining in three-dimensional space dimensions of the position-motion state of a moving object relative to well separated reference points, said moving object being capable of reflecting waves, the position-motion state of each said reference point being known and the position of said moving object relative to said reference points being entirely unknown at all points along its path including the end points of said path, waves being simultaneously transmitted across the entirely unknown distances between said moving object and said reference points, said moving object being illuminated by wave radiation means, doppler sensitive means being used to perform simultaneous measurements on the waves reflected from said moving object, the position-motion information contained in said measurements being converted to a more useful coordinate system relative to which the position-motion states of said reference points are known, said system comprising wave communications apparatuses at the locations of all of the reference points, said method comprising the following non-mental elements;
   1. establishing at the locations of each of three reference points wave communications means;
   2. illuminating the moving object by wave radiation means;
   3. detecting waves reflected from said moving object using mixing and filter means to create alternating current electrical signals whose instantaneous time rates of phase change are linearly dependent upon the time rates of change of the simultaneous distances between said reference points and said moving object;
   4. automatically measuring the magnitudes of the time variations of phase of said alternating current electrical signals and generating physical representations of the magnitudes resultant of said measuring;
   5. automatically introducing said physical representations into automatic computing means;
   6. introducing into said automatic computing means physical representations of the dimensions of the position-motion state of said reference point;
   7. computing automatically in said automatic computing means the dimensions of the position-motion state of said moving object;
   8. automatically extracting from said automatic computing means a physical representation of said dimensions of the position-motion state of said object.

5. A method as recited in claim 4 further limited in that said moving object is simultaneously illuminated by wave transmitting means located at each of said reference points.

6. A method as recited in claim 4 further limited in that said moving object is simultaneously illuminated by wave transmitting means located at each of said reference points, further limited in detecting at a single place waves transmitted by all of the transmitting means and reflected from said moving object and performing the recited automatic functions at said single place.

7. A method as recited in claim 4 further limited in illuminating said moving object by wave transmitting means remote from any of said reference points and further limited in that receiving apparatus is located at each of said reference points, said receiving apparatus being sensitive to the transmitted waves reflected from said moving object.

8. In an automatic tracking system a method of determining in three-dimensional space dimensions of the position-motion state of a moving vehicle relative to well separated reference points whose positions are known and relative to which the position of said moving vehicle is entirely unknown at all points along its path including the end points of said path, pulse waves being transmitted and received across the entirely unknown distances between said moving vehicle and said reference point, doppler sensitive means being used to perform simultaneous measurements on said wave pulses, which measurements collectively define physically the position-motion state of said moving vehicle, the position-motion information contained in said measurements being converted to a more useful coordinate system relative to which the position-motion states of said reference points are known, said system comprising wave apparatuses at the locations of all of the reference points and aboard the moving vehicle, said method comprising the following non-mental elements:

1. establishing at the locations of each of three reference points pulse wave means cooperative with pulse wave means installed aboard said moving vehicle;
2. installing aboard said moving vehicle pulse wave means cooperative with said pulse wave means established at each of said three reference points;
3. transmitting wave pulses between said cooperative pulse wave means recited in Element 1 and said cooperative pulse wave means recited in Element 2;
4. detecting said wave pulses to create signals dependent upon the time rates of change of the simultaneous distances between said reference points and said moving vehicle;
5. automatically measuring said signals and generating physical representations of the magnitudes resultant of said measuring;
6. automatically introducing said physical representations into automatic computing means;
7. introducing into said automatic computing means physical representations of the dimensions of the position-motion state of said reference points;
8. computing automatically in said automatic computing means the dimensions of the position-motion state of said moving vehicle in said useful coordinate system;
9. automatically extracting from said automatic computing means a physical representation of said dimensions of the position-motion state of said vehicle.

9. A method as recited in claim 8 further limited in that said wave means established at each said reference point is a pulse wave transmitting means, further limited in that the wave means installed on board said moving vehicle is a pulse wave receiving means sensitive to the waves emitted by each of said pulse wave transmitting means.

10. A method as recited in claim 8 further limited in that the wave means installed on board said moving vehicle is a pulse wave transmitting means, further limited in that the wave means established at each of said reference points is a pulse wave receiving means sensitive to the pulse waves emitted by said pulse wave transmitting means, said receiving means being connected by communications means to a common location, and further limited in performing the recited automatic functions at said common location.

11. In an automatic position determining system a method of determining in three-dimensional space dimensions of the position-motion state of a moving object relative to well separated reference points whose positions are known and relative to which the position of said moving object is entirely unknown at any point of the path of said object including the end points of said path, pulse waves being simultaneously transmitted across the entirely unknown distances between said moving object and said reference points, said moving object being illuminated by pulse wave radiation means, doppler sensitive means being used to perform simultaneous measurements on the pulse waves reflected from said moving object which simultaneous measurements collectively define the position-motion state of said moving object, the position-motion information contained in said simultaneous measurements being converted to a more useful coordinate system relative to which the position-motion states of said reference points are known, said system comprising pulse wave apparatus at the locations of all of said reference points, said method comprising the following non-mental elements:

1. establishing at the locations of each of three reference points pulse wave means;
2. illuminating the moving object by pulse wave radiation means;
3. detecting pulse wave signals reflected from said moving object to create signals dependent upon the time rates of change of the simultaneous distances between said reference points and said moving object;
4. automatically measuring said signals and generating physical representations of the magnitudes resultant of said measuring;
5. automatically introducing said physical representations into automatic computing means;
6. introducing into said automatic computing means physical representations of the dimensions of the position-motion states of said reference points;
7. computing automatically in said automatic computing means the dimensions of the position-motion state of said moving object;
8. automatically extracting from said automatic computing means a physical representation of said dimensions of the position-motion state of said object.

12. A method as recited in claim 11 further limited in that said moving object is simultaneously illuminated by pulse wave transmitting means located at each of said reference points.

13. A method as recited in claim 11 further limited in that said moving object is simultaneously illuminated by pulse wave transmitting means located at each of said reference points, further limited in detecting at a single place waves transmitted by all of the pulse wave transmitting means and reflected from said moving object, and performing the recited automatic functions at said single place.

14. A method as recited in claim 11 further limited in illuminating said moving object by pulse wave transmitting means remote from any of said reference points and further limited in that pulse wave receiving apparatus is located at each of said reference points, said pulse wave receiving apparatus being sensitive to the transmitted pulse waves reflected from said moving object.

15. In an automatic position determining system, apparatus for determining in three-dimensional spaced dimensions of the position-motion state of a moving vehicle relative to well separated reference points whose positions are known and relative to which the position of said vehcle is entirely unknown at all points along the path of said vehicle including the end points of said path, said apparatus transmitting waves across the entirely unknown distances between said moving vehicle and each said reference point, said apparatus also performing simultaneous doppler measurements on said waves which measurements collectively define physically the position-motion state of said moving vehicle, said apparatus also converting by computing means the position-motion information contained in said measurements to a more useful coordinate system relative to which the position-motion states of said reference points are known, said apparatus comprising the following elements:
  1. three wave stations serving as space reference points and as terminals for performing doppler measurements relative to said reference points, said stations cooperative with wave means aboard said moving vehicle;
  2. aboard said moving vehicle wave means cooperative with said wave stations recited in Element 1;
  3. detecting means detecting waves transmitted between the apparatuses recited in Element 1 and the apparatus recited in Element 2, said means for detecting waves creating signals whose instantaneous time rates of phase change are linearly dependent upon the time rates of change of the simultaneous distances between said reference points and said moving vehicle;
  4. measuring means connected to said detecting means automatically measuring the magnitudes of the time variations of phase of said signals and generating physical representations of the magnitudes resultant of said measuring;
  5. automatic computing means connected to said measuring means and responsive to said physical representations;
  6. automatic data processing means automatically introducing into automatic computing means physical representations of the dimensions of the position-motion state of said reference points;
  7. second automatic data processing means automatically extracting from said automatic computing means a physical representation of said dimension of the position-motion state of said vehicle.

16. An apparatus as recited in claim 15 further limited in that said wave stations serving as reference points are wave transmitters, further limited in that the wave means aboard said moving vehicle is a wave receiving means sensitive to each of said wave transmitting means.

17. An apparatus as recited in claim 15 further limited in that the wave means aboard said moving vehicle is a wave transmitting means, further limited in that said wave stations serving as reference points are wave receiving means sensitive to the waves emitted by said transmitting means, said receiving means being connected by communications means to a common location, and further limited in performing the recited automatic functions at said common location.

18. In an automatic position determining system, apparatus for determining in three-dimensional space dimensions of the position-motion state of a moving object relative to well separated reference points whose positions are known and relative to which the position of said object is entirely unknown at all points along the path of said object including end points of the path, said moving object being capable of reflecting waves, said apparatus transmitting waves across the entirely unknown distances between said moving object and each said reference point, said apparatus performing simultaneous doppler measurements on waves reflected by said moving object which measurements collectively define physically the position-motion state of said moving object, said apparatus also converting by computing means the position-motion information contained in said measurement to a more useful coordinate system relative to which the position-motion states of said reference points are known, said apparatus comprising the following elements:
  1. three wave stations serving as space reference points and as terminals for performing doppler measurements relative to said reference points;
  2. wave radiation means illuminating said moving object;
  3. detecting means detecting waves reflected from said moving object, said waves being originally transmitted by said radiation means illuminating said moving object, said detecting means creating signals whose instantaneous time rates of change are linearly dependent upon the time rates of change of the simultaneous distances between said reference points and said moving object;
  4. measuring means connected to said detecting means automatically measuring the magnitudes of the time variations of phase of said signals and generating physical representations of the magnitudes resultant of said measuring;
  5. automatic computing means connected to said measuring means and responsive to said physical representations;
  6. automatic data processing means automatically introducing into said automatic computing means physical representations of the dimensions of the position-motion states of said reference points;
  7. second automatic data processing means automatically extracting from said automatic computing means physical representations of said dimensions of the position-motion state of said moving object.

19. An apparatus as recited in claim 18 further limited in that said wave radiation means are located at each said reference point and illuminate said moving object.

20. An apparatus as recited in claim 18 further limited in that said wave radiation means illuminating said moving object are the wave stations serving as said reference points, further limited in said detecting means being located at a single place.

21. An apparatus as recited in claim 18 further limited in that said wave radiation means illuminating said moving object is a transmitter located remote from any of said reference points and further limited in that said detecting means are located at each of said reference points, said detecting means being sensitive to the transmitted waves reflected from said moving object.

22. In an automatic position determining system, apparatus for determining in three dimensional space dimensions of the position-motion state of a moving vehicle relative to well separated reference points whose positions are known and relative to which the position of said moving vehicle is entirely unknown at all points along the path of said vehicle including end points of said path, said apparatus transmitting pulse waves across the entirely unknown distance between said moving vehicle and each said reference point, said apparatus also performing simultaneous doppler measurements on said pulse waves which measurements collectively define physically the position-motion state of said moving vehicle, said apparatus also converting by computing means the position-motion information contained in said measurements to a more useful coordinate system relative to which the position-motion states of said reference points are known, said apparatus comprising the following elements:
1. three pulse wave stations serving as space reference points and as terminals for performing doppler measurements relative to said reference points, said stations cooperative with pulse wave means aboard said moving vehicle;
2. aboard said moving vehicle pulse wave means cooperative with said stations recited in Element 1;
3. detecting means detecting pulse waves transmitted between the apparatuses recited in Element 1 and the apparatus recited in Element 2, said detecting means creating signals whose time rates of change are linearly dependent upon the time rates of change of the simultaneous distances between said reference points and said moving vehicle;
4. measuring means connected to said detecting means automatically measuring the magnitudes of the time variations of said signals and generating physical representations of the magnitudes resultant of said measuring;
5. automatic computing means connected to said measuring means and responsive to said physical representations;
6. automatic data processing means automatically introducing into said automatic computing means physical representations of the dimensions of the position-motion state of said reference points;
7. second automatic data processing means automatically extracting from said automatic computing means a physical representation of said dimension of the position-motion state of said vehicle.

23. An apparatus as recited in claim 22 further limited in that said pulse wave stations serving as reference points are pulse wave transmitters, further limited in that the pulse wave means aboard said moving vehicle is a pulse wave receiving means sensitive to each of said pulse wave transmitting means.

24. An apparatus as recited in claim 22 further limited in that the pulse wave means aboard said moving vehicle is a pulse wave transmitting means, further limited in that said pulse wave stations serving as reference points are pulse wave receiving means sensitive to the pulse waves emitted by said transmitting means, said receiving means being connected by communications means to a common location, and further limited in performing the recited automatic functions at said common location.

25. In an automatic position determining system, apparatus for determining in three dimensional space dimensions of the position-motion state of a moving object relative to well separated reference points whose positions are known and relative to which the position of said moving object is entirely unknown at all points along the path of said object including the end points of said path, said moving object being capable of reflecting waves, said apparatus transmitting pulse waves across the entirely unknown distances between said moving object and each said reference point, said apparatus also performing simultaneous doppler measurements on pulse waves reflected by said moving object which measurements collectively define physically the position-motion state of said moving object, said apparatus also converting by computing means the position-motion information contained in said measurement to a more useful coordinate system relative to which the position-motion states of said reference points are known, said apparatus comprising the following elements:
1. three pulse wave stations serving as space reference points and as terminals for performing doppler measurements relative to said reference points;
2. pulse wave radiation means illuminating said moving object
3. pulse wave detecting means detecting pulse waves reflected from said moving object, said pulse waves being originally transmitted by said pulse wave radiation means illuminating said moving object, said pulse wave detecting means creating signals whose variations with respect to time are linearly dependent upon the variations with respect to time of the simultaneous distances between said reference points and said moving object;
4. measuring means connected to said pulse wave detecting means automatically measuring the magnitudes of the time variations of said signals and generating physical representations of the magnitudes resultant of said measuring;
5. automatic computing means connected to said measuring means and responsive to said physical representations;
6. automatic data processing means automatically introducing into said automatic computing means physical representations of the dimensions of the position-motion state of said reference points;
7. second automatic data processing means automatically extracting from said automatic computing means a physical representation of said dimension of the position-motion state of said moving object.

26. An apparatus as recited in claim 25 further limited in that said pulse wave radiation means are located at each said reference point and illuminate said moving object.

27. An apparatus as recited in claim 25 further limited in that said pulse wave radiation means illuminating said moving object are the pulse wave stations serving as said reference points, further limited in said detecting means being located at a single place.

28. An apparatus as recited in claim 25 further limited in that said pulse wave radiation means illuminating said moving object is a pulse transmitter located remote from any of said reference points and further limited in that said detecting means are located at each of said reference points, said detecting means being sensitive to the transmitted pulse waves reflected from said moving object.

* * * * *